(12) United States Patent
Kounavis et al.

(10) Patent No.: US 12,135,643 B2
(45) Date of Patent: Nov. 5, 2024

(54) SEQUESTERED MEMORY FOR SELECTIVE STORAGE OF METADATA CORRESPONDING TO CACHED DATA

(71) Applicant: Intel Corporation, Santa Clara, CA (US)

(72) Inventors: Michael Kounavis, Portland, OR (US); Siddhartha Chhabra, Portland, OR (US); David M. Durham, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 764 days.

(21) Appl. No.: 17/096,274

(22) Filed: Nov. 12, 2020

(65) Prior Publication Data
US 2022/0147453 A1 May 12, 2022

(51) Int. Cl.
*G06F 12/0802* (2016.01)
*H04L 9/32* (2006.01)

(52) U.S. Cl.
CPC ............ *G06F 12/0802* (2013.01); *H04L 9/32* (2013.01); *G06F 2212/60* (2013.01)

(58) Field of Classification Search
CPC ............ G06F 12/0802; G06F 12/0888; G06F 12/084; H04L 9/32
USPC ............... 711/3, 113, 118, 128, 173, 12.001, 711/12.069
See application file for complete search history.

(56) References Cited

U.S. PATENT DOCUMENTS

| | | | |
|---|---|---|---|
| 5,666,114 A | 9/1997 | Brodie et al. | |
| 8,195,891 B2 | 6/2012 | Trika | |
| 9,092,644 B2 | 7/2015 | Trivedi et al. | |
| 10,296,255 B1 * | 5/2019 | Tummala | G06F 3/065 |
| 10,325,118 B2 | 6/2019 | Chhabra et al. | |
| 10,498,865 B2 | 12/2019 | Kounavis et al. | |
| 10,540,198 B2 | 1/2020 | Durham et al. | |

(Continued)

OTHER PUBLICATIONS

Extended European Search Report for European Patent Application No. 21198156.8 notified Jul. 12, 2022, 16 pgs.

(Continued)

*Primary Examiner* — Yaima Rigol
*Assistant Examiner* — Edward Waddy, Jr.
(74) *Attorney, Agent, or Firm* — Essential Patents Group, LLP

(57) ABSTRACT

Techniques and mechanisms for metadata, which corresponds to cached data, to be selectively stored to a sequestered memory region. In an embodiment, integrated circuitry evaluates whether a line of a cache can accommodate a first representation of both the data and some corresponding metadata. Where the cache line can accommodate the first representation, said first representation is generated and stored to the line. Otherwise, a second representation of the data is generated and stored to a cache line, and the metadata is stored to a sequestered memory region that is external to the cache. The cache line include an indication as to whether the metadata is represented in the cache line, or is stored in the sequestered memory region. In another embodiment, a metric of utilization of the sequestered memory region is provided to software which determines whether a capacity of the sequestered memory region is to be modified.

20 Claims, 18 Drawing Sheets

(56) References Cited

U.S. PATENT DOCUMENTS

| | | | |
|---|---|---|---|
| 2012/0198175 A1* | 8/2012 | Atkisson | G06F 12/0833 |
| | | | 711/135 |
| 2013/0290607 A1 | 10/2013 | Chang et al. | |
| 2017/0083724 A1 | 3/2017 | Chhabra et al. | |
| 2017/0177505 A1 | 6/2017 | Basak et al. | |
| 2017/0185529 A1 | 6/2017 | Chhabra et al. | |
| 2017/0371793 A1 | 12/2017 | Saidi et al. | |
| 2019/0095350 A1 | 3/2019 | Durham et al. | |
| 2020/0104208 A1* | 4/2020 | Heo | G06F 11/1435 |
| 2020/0104262 A1 | 4/2020 | Das et al. | |
| 2021/0406239 A1 | 12/2021 | Kounavis et al. | |

OTHER PUBLICATIONS

Partial European Search Report from European Patent Application No. 21198156.8 notified Mar. 22, 2022, 15 pgs.

Office Action from European Patent Application No. 21198156.8 notified May 7, 2024, 8 pgs.

* cited by examiner

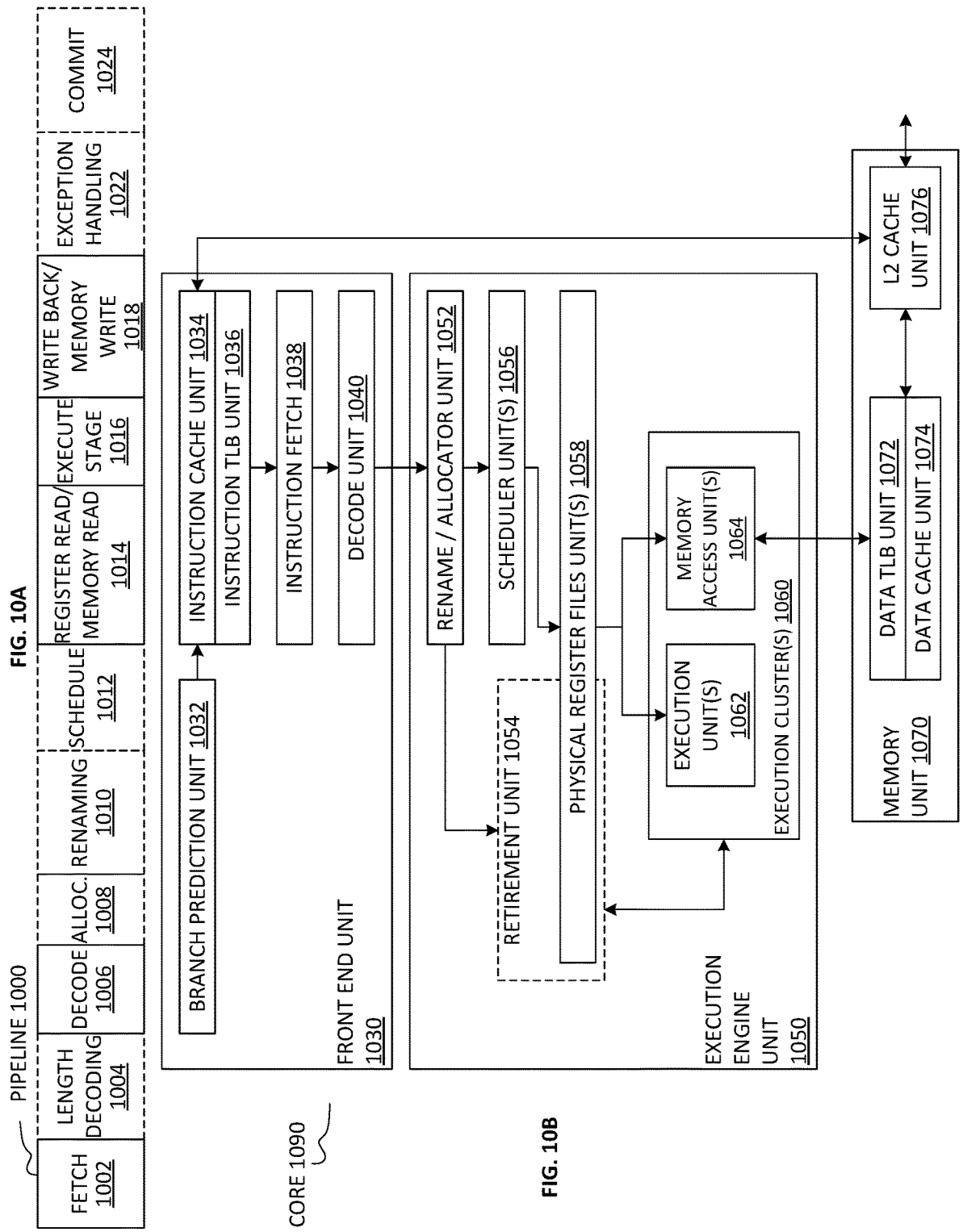

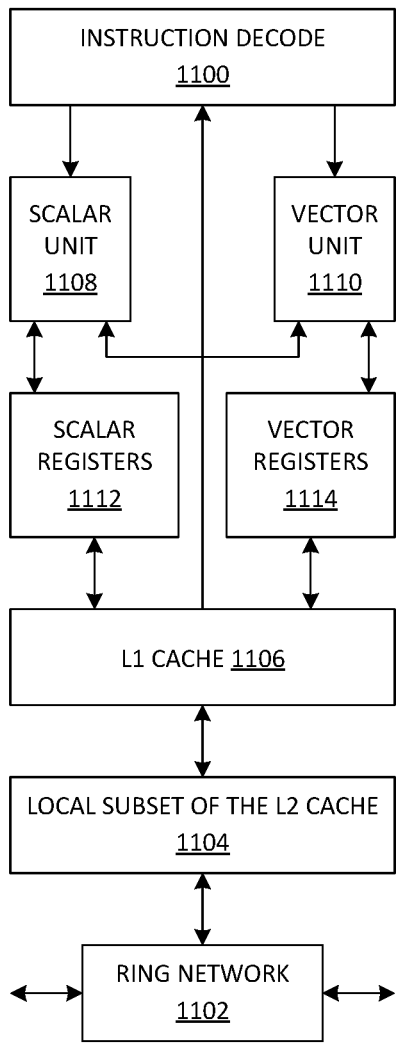
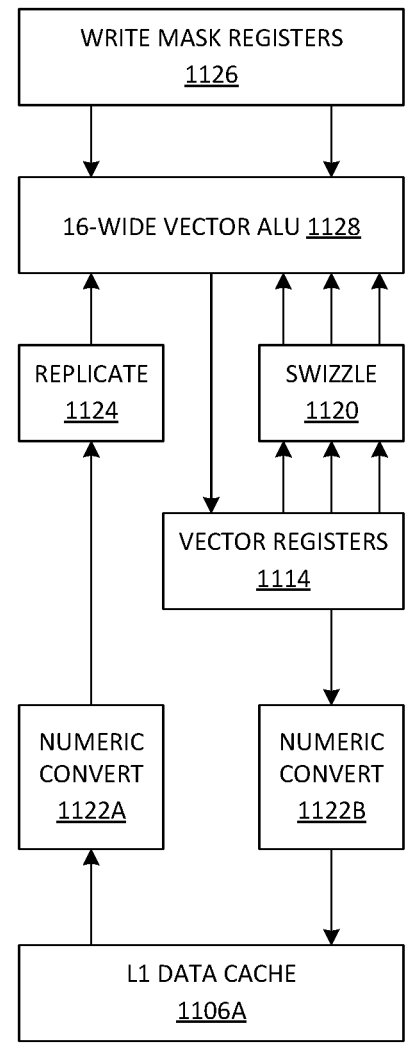
FIG. 11A                    FIG. 11B

SEQUESTERED MEMORY FOR SELECTIVE STORAGE OF METADATA CORRESPONDING TO CACHED DATA

BACKGROUND

1. Technical Field

This disclosure generally relates to memory caching and more particularly, but not exclusively, to the repositories for metadata which corresponds to cached data.

2. Background Art

The storage subsystem is one of the slowest subsystems of a computer system, especially when the storage subsystem utilizes a storage medium such as a hard-disk drive (HDD). Typically, a HDD requires relatively long access time as the read/write heads need to be moved mechanically to a particular location on the platters of the HDD in order to read/write data.

To improve the performance of such storage devices, a cache memory is often used to hold the results of recent reads from a storage device and writes to the storage device. By caching such data, the performance of a computer system can be increased, and the storage device can remain in a relatively low power state for longer durations to reduce power consumption of the computer system.

As successive generations of memory technologies continue to improve in speed, capacity and energy efficiency, there is expected to be an increasing premium placed on improvements to the allocation of memory resources for use in determining the accessibility and use of cached data.

BRIEF DESCRIPTION OF THE DRAWINGS

The various embodiments of the present invention are illustrated by way of example, and not by way of limitation, in the figures of the accompanying drawings and in which:

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

FIGS. 11A-B illustrate a block diagram of a more specific exemplary in-order core architecture, which core would be one of several logic blocks (including other cores of the same type and/or different types) in a chip.

DETAILED DESCRIPTION

Figure 1:
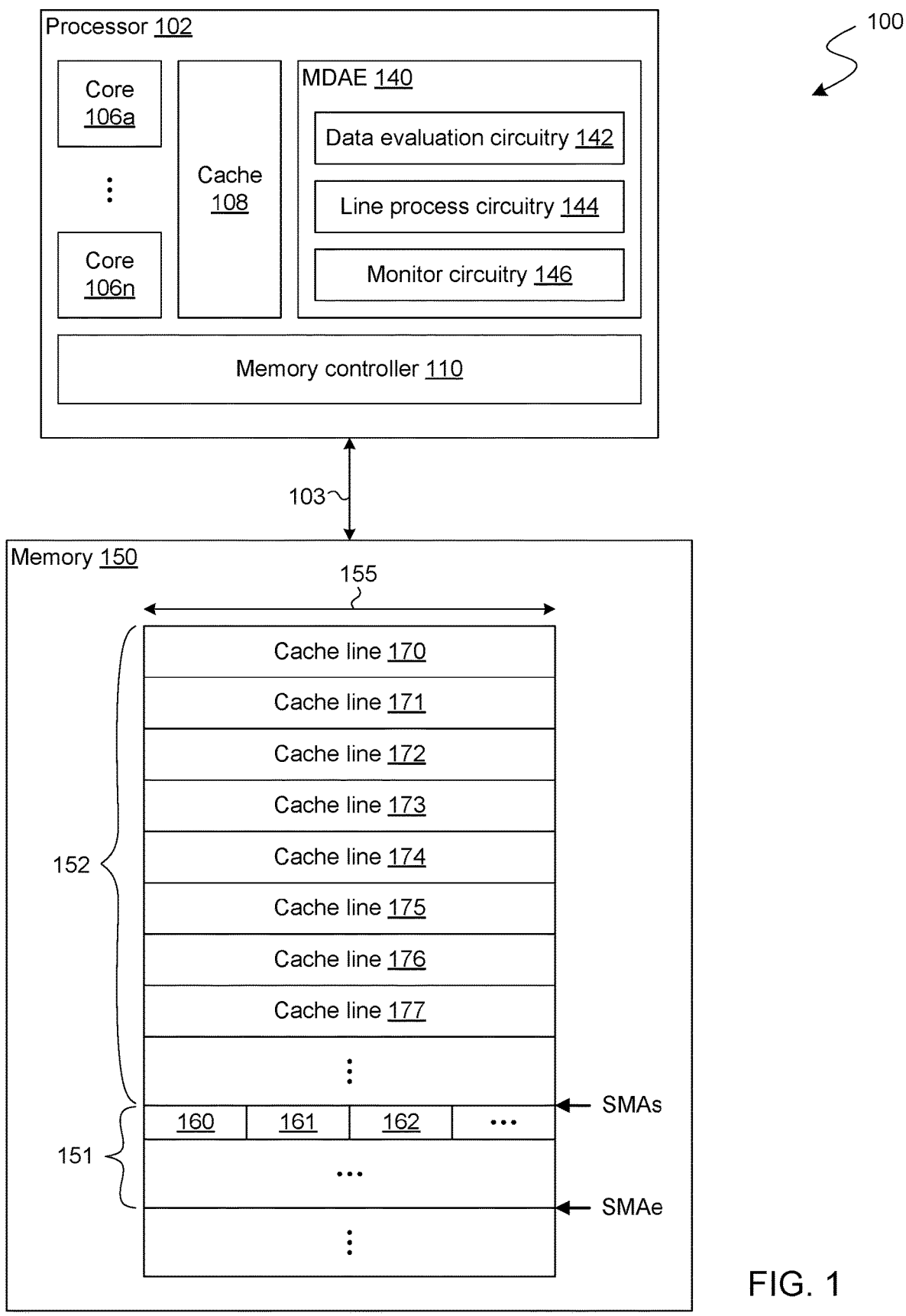
FIG. 1 illustrates a functional block diagram showing features of a system to provide access to metadata according to an embodiment.

Embodiments discussed herein variously provide techniques and mechanisms for metadata, which corresponds to cached data, to be selectively stored to a sequestered memory region. The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including circuitry to store variously data and corresponding data different memory regions.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Certain features of various embodiments are described herein with reference to the use of a sequestered memory region, in combination with another memory region (which is to operate as a cache), to facilitate access to data and corresponding metadata. For example, the metadata includes one or more of a media access control (MAC) value, permission information, error correction information (such as an error correction code), version information, or the like. In some embodiments, a line of a cache is used to store a representation of at least some data, wherein the sequestered memory region is made available—subject to one or more conditions—to store metadata which corresponds to said data. In one such embodiment, storage of such metadata at the sequestered memory region is based on a determination, according to one or more criteria, that the cache line is unable to accommodate a representation of both the data and the metadata. Alternatively, the cache line stores said representation of both the data and the metadata, where the one or more criteria allow for such storage.

Unless otherwise indicated, "sequestered memory region" refers herein to a memory region which is allocated to be used for storing metadata which corresponds to data that has been, or is to be, stored or otherwise represented in a cache. Furthermore, as used herein in the context of a memory cache, "representation" generally refers to at least some contents of a given cache line, wherein said contents are equal to, or otherwise representative of (for example, generated based on), information including data and, in some embodiments, at least some metadata which corresponds to said data. For example, contents of one such cache line represent information which has been compressed, encrypted and/or otherwise processed, wherein a format and/or other characteristic of the representation, by virtue of such processing, is different than that of the original information. Such a representation accommodates decompression, decryption, and/or other inverse processing to calculate or otherwise generate the data (and, in some embodiments, corresponding metadata) from which the representation was previously determined. In one such embodiment, information (e.g., data and, for example, metadata) is determined based on a read of a representation thereof in a cache line, and independent of any accessing of some other additional or alternative representation of said information.

Certain features of various embodiments are described herein with reference to a sequestered memory region and a cache which are both external to a processor. However, alternative embodiment variously provide a sequestered memory region which is to supplement one or more of caches within a processor—e.g., including one of a L0 cache, a L1 cache, a LLC (e.g., a shared cache) or the like. Furthermore, certain features of various embodiments are described herein with reference to hardware—e.g., circuit structures—which selectively determines whether a representation of metadata is to be stored to a particular one of a cache or a sequestered memory region, and with further reference to software which determines the changing of an available capacity of the sequestered memory region. However, some embodiments are not limited with respect to whether, for some or all such operations, the operation(s) are to be performed solely with hardware, with software, or with a particular combination of hardware and software.

FIG. 1 is a block diagram illustrating a system 100 that supplements data caching with a sequestered memory region for conditionally storing metadata according to one embodiment. System 100 includes, or supports operation in, any of various computing devices including handheld devices and devices for embedded applications. For example, system 100 provides or is to operate as a component of any of various devices including, but not limited to, a desktop computer, a tablet computer, a laptop computer, a netbook, a notebook computer, a personal digital assistant (PDA), a server, a workstation, a cellular telephone, a mobile computing device, a smart phone, an Internet Protocol device, a digital camera or the like. In some embodiments, some or all of system 100 is implemented in a system on a chip (SoC).

System 100 comprises a processor 102 and a memory 150 which is coupled thereto—e.g., via the illustrative processor bus 103 shown. Memory 150 is to provide a cache for data in one or more other memory resources (not shown) which system 100 includes or, alternatively, is to couple to—e.g., wherein the one or more other memory resources comprises solid state drive (SSD), hard disk drive (HDD) or any of a variety of other suitable memory devices.

One embodiment is described in the context of a single processor desktop or server system, but alternative embodiments are included in a multiprocessor system. Processor 102, as one illustrative example, includes a complex instruction set computer (CISC) microprocessor, a reduced instruction set computing (RISC) microprocessor, a very long instruction word (VLIW) microprocessor, a processor implementing a combination of instruction sets, or any other processor device, such as a digital signal processor, for example. The processor 102 is coupled to processor bus 103, which transmits data signals between the processor 102 and another component in system 100, such as memory 150, for storing instruction, data, or any combination thereof.

Processor 102 includes one or more cores 106a, . . . , 106n to execute instructions of system 100. The cores 106a, . . . , 106n include, but is not limited to, pre-fetch logic to fetch instructions, decode logic to decode the instructions, execution logic to execute instructions and the like. The processor 102 includes a cache 108 to cache instructions and/or data. The cache 108 includes, but is not limited to, level one, level two, and a last level cache (LLC), or any other configuration of the cache memory within the processor 102. Depending on the architecture, the processor 102 has a single internal cache or multiple levels of internal caches. Other embodiments include a combination of both internal and external caches. A register file is to store different types of data in registers including integer registers, floating-point registers, vector registers, banked registers, shadow registers, checkpoint registers, status registers, configuration registers, and instruction pointer register.

In one example, one or more of cores 106a, . . . , 106n each comprise a floating-point unit. In another example, processor 102 does not have a floating-point unit. The processor 102, in one embodiment, includes a microcode (ucode) ROM to store microcode, which when executed, is to perform algorithms for certain macroinstructions or handle complex scenarios. Here, microcode is potentially updateable to handle logic bugs/fixes for processor 102. Alternate embodiments of an execution unit (e.g., rather than one provided with cores 106a, . . . , 106n) are also used, for example, in micro controllers, embedded processors, graphics devices, DSPs, and other types of logic circuits.

In an embodiment, processor 102 comprises (or alternatively, is coupled to) a memory controller 110 which is to perform functions that enable the processor 102 to access and communicate with memory 150. Memory 150 comprises random access memory (RAM) in a fixed or removable format. RAM includes volatile memory configured to hold information during the operation of system 100 such as, for example, static RAM (SRAM) or Dynamic RAM (DRAM). Other fixed/removable memory includes, but is not limited to, magnetic memories such as, for example, floppy disks, hard drives, etc., electronic memories such as solid state flash memory (e.g., embedded multimedia card (eMMC), etc.), removable memory cards or sticks (e.g., micro storage device (uSD), USB, etc.), optical memories such as compact disc-based ROM (CD-ROM), Digital Video Disks (DVD), Blu-Ray Disks, etc.

Memory 150 illustrates any of a variety of one or more memory devices which are to provide a first memory region for operation as a cache, as well as a second memory region which is sequestered for use in storing metadata that corresponds to data represented in the cache. In an illustrative scenario according to one embodiment, various partitions and/or other allocated regions of memory 150 are setup, for example, at boot time by a basic input-output system (BIOS). Alternatively, processor 102 executes instructions of an operating system (OS), a virtual machine monitor (VMM) or other software agent which provides functionality to initialize, modify or otherwise determine an allocation of memory resources.

In the example embodiment shown, memory 150 is configured to provide a first logical segment which is to function as a sequestered memory region 151 and a second logical segment which is to function as a cache 152. A block width 155 of the memory 150 shows the data bit width of the memory 150. In some embodiments, the configuration of the memory 150 also includes other logical segments (not shown) that are used for other purposes such as data storage, data indexing, or the like.

By way of example, the logical segment of cache 152 is illustrated at least with eight cache lines 170-177 that are used to variously store representations of data from a hard disk drive (HDD), solid state drive (SSD) or other relatively long-term storage (not shown) that system 100 includes or, alternatively, is to couple to. For example, a given one of cache lines 170-177 is to store a representation of both data and metadata which corresponds to said data. One of ordinary skill in the relevant art will readily appreciate that the memory 150 can have more than eight cache lines. The block width 155 is not limited to a particular bit width. In one embodiment, the block width 155 is the bus width of processor bus 103. In another embodiment, the block width 155 is set to store a multiple of the logical block addresses (LBAs) of a storage drive, such as a HDD or a SSD. For example, each cache line of the caching device is set to a block width 155 that can store four LBAs of the storage drive.

The logical segment of sequestered memory region 151 is allocated to store metadata (including, for example, the illustrative metadata values 160, . . . , 162 shown) which correspond each to respective data that is represented in one of cache lines 170-177. Sequestered memory region 151 is defined for example, with one or more pointers, registers or other such resources which provide an identifier SMAs of a start of sequestered memory region 151, and an identifier SMAe of an end of sequestered memory region 151.

In some embodiments, system 100 provides functionality to selectively store to sequestered memory region 151 metadata for only some data which is represented in one or more lines of cache 152—e.g., wherein one or more other lines of cache 152 each store a respective representation of both data and corresponding metadata. By way of illustration and not limitation, system 100 comprises circuitry, such as the illustrative metadata access engine (MDAE) 140 shown, which identifies, according to one or more predetermined criteria, a memory resource which is to store a representation of at least some metadata which corresponds to data that has been (or is to be) represented in a line of cache 152. MDAE 140 comprises one or more microcontrollers, application specific integrated circuitry (ASICs), state machines, programmable gate arrays, memory resources, mode registers, fuses and/or any of various other suitable circuit structures to provide functionality such as that described herein.

In some embodiments, data evaluation circuitry 142 of MDAE 140 is coupled to detect that some data (to be use by cores 106a, . . . , 106n, for example) is to be cached—e.g., wherein a cache miss results in such data being retrieved from a storage device and provided to data evaluation circuitry 142. Based on such detecting, data evaluation circuitry 142 performs an evaluation of the data to determine whether, according to some predefined criteria, a line of cache 152 is able to accommodate a representation of both the data and some metadata which corresponds to the data. In one such embodiment, data evaluation circuitry 142 determines whether a size of the data allows for the data to be stored in the same line with said metadata. Alternatively or in addition, data evaluation circuitry 142 determines whether one or more characteristics of the data indicate that the data is sufficiently compressible for a cache line to accommodate a representation of both the data and the metadata. In some embodiments, data evaluation circuitry 142 determines whether any of a variety of additional or alternative processes—e.g., to encrypt or otherwise manipulate the data—might allow for a cache line to store a representation of both the data and the metadata.

In one such embodiment, MDAE 140 further comprises line process circuitry 144 which, based on the evaluation by data evaluation circuitry 142, generates a representation of the data (and, where applicable, of the corresponding metadata) for storage to one of cache lines 170-177. In an illustrative scenario according to one embodiment, line process circuitry 144 performs a compression operation and/or an encryption operation with the data, and with at least some corresponding metadata, to generate the representation—e.g., wherein MDAE 140 foregoes storing the at least some metadata to sequestered memory region 151. In an alternative scenario, line process circuitry 144 stores the data (or some other representation thereof) to the one of cache lines 170-177, and further stores the at least some metadata to sequestered memory region 151.

In some embodiments, MDAE 140 additionally or alternatively provides functionality to access data, and corresponding metadata, by selectively reading from one or both of sequestered memory region 151 and cache 152. For example, MDAE 140 is coupled to receive a message (e.g., from one of cores 106a, . . . , 106n) which requests data, and—based on the message—to read from one of cache lines 170-177 a representation of said data. In one such embodiment, data evaluation circuitry 142 (or other suitable circuitry of MDAE 140) performs an evaluation to determine whether the cache line stored a representation of both the requested data and some corresponding metadata.

By way of illustration and not limitation, in some embodiments, data evaluation circuitry 142 detects for a particular single bit (referred to herein as an "extension bit") of the representation, where the value of said bit specifies whether or not some metadata is to be retrieved from sequestered memory region 151. Alternatively or in addition, line process circuitry 144 performs a decryption, a decompression and/or other such process to convert the representation into a form which more explicitly identifies the data (and, for example, some corresponding metadata). Subsequently, data evaluation circuitry 142 performs an evaluation of the converted information to detect for the presence (or absence) of first metadata—e.g., wherein the converted information includes second metadata which specifies or otherwise indicates whether the first metadata needs to be retrieved from sequestered memory region 151.

In selectively storing metadata to sequestered memory region 151 only under certain conditions, some embodiments variously enable a capacity of sequestered memory region 151 (e.g., an unused capacity thereof) to be changed at various times during operation of system 100. For example, in some embodiments, MDAE 140 further comprises (or alternatively, is coupled to operate with) monitor circuitry 146 which maintains one or more metrics of utilization of sequestered memory region 151. Such one or more metrics include, or are otherwise based on, a count of used (or unused) portions of sequestered memory region 151, for example. In one such embodiment, the one or more metrics are made available to an operating system or other software process that is executed with cores 106a, . . . , 106n. In some embodiments, a software process changes one or both of identfiers SMAs, SMAe—based on the one or more metrics maintained by monitor circuitry 146—to change an available (e.g., unused) capacity of sequestered memory region 151.

Figure 2A:
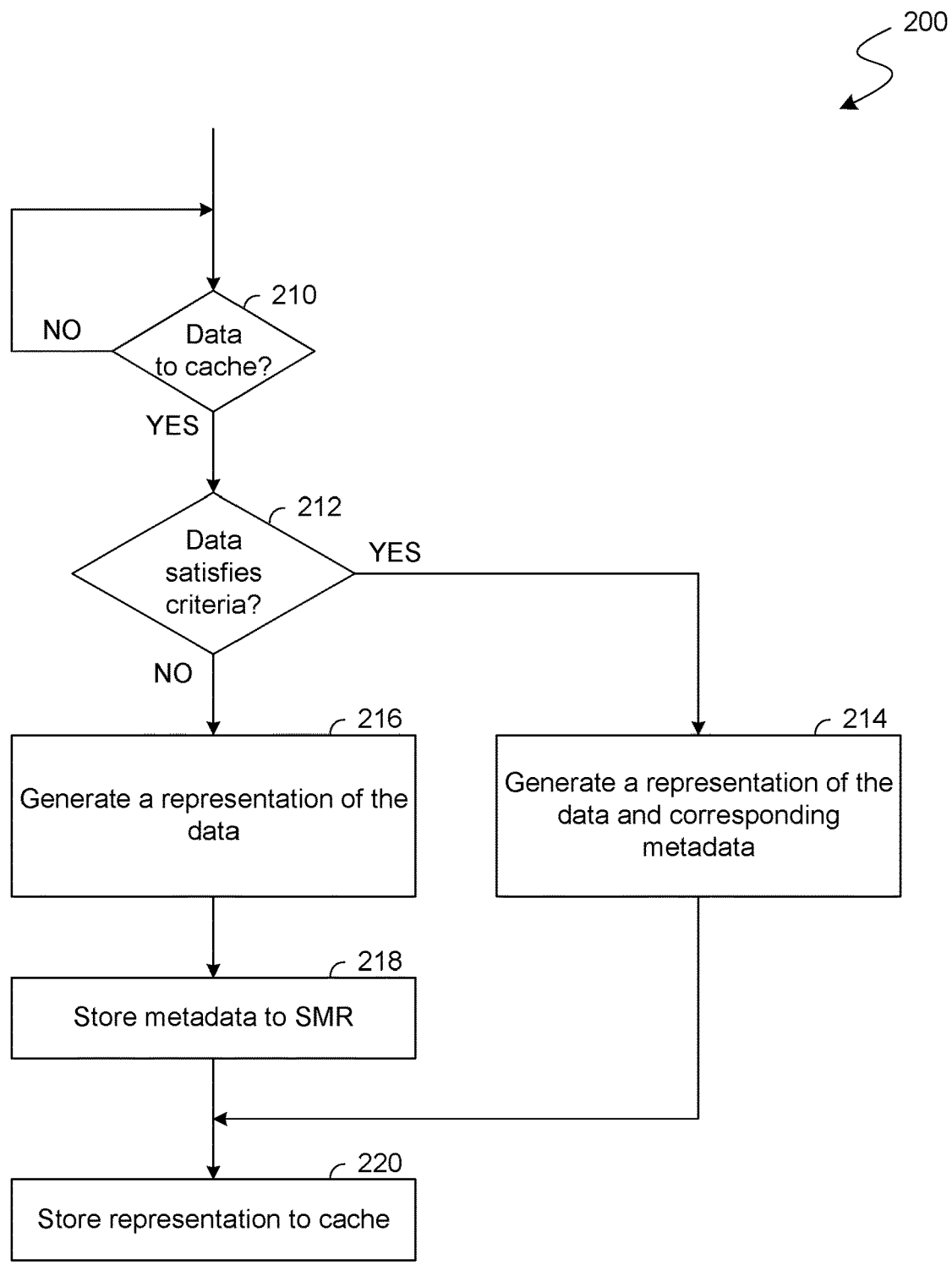
FIG. 2A illustrates a flow diagram showing features of a method to determine a repository for receiving metadata according to an embodiment.

FIG. 2A shows features of a method 200 to determine a repository for storing information to represent metadata according to an embodiment. Method 200 is one example of an embodiment wherein one of a cache or a sequestered memory region is selected to store a representation of metadata, where such selection is based on an evaluation of corresponding data that is to be represented in a line of the cache. In an embodiment, method 200 is performed with functionality such as that of system 100.

As shown in FIG. 2A, method 200 (at 210) determining whether data is to be stored to a cache. By way of illustration and not limitation, the determining at 210 comprises data evaluation circuitry 142 determining whether data has been retrieved from a storage device (e.g., in response to a cache miss which results from a read request by one of cores 106a, . . . , 106n) for which memory 150 provides cache functionality. Where it is determined at 210 that no such data is to be cached, method 200 repeats such determining at 210 until some next data has been detected.

Where it is instead determined at 210 that some data is to be cached, method 200 (at 212) performs an evaluation of the data to determine whether said data satisfies a predetermined criteria which is indicative of a line of a cache being able to accommodate a representation of both the data and some first metadata which corresponds to the data. In various embodiments, the first metadata comprises one or more of a media access control (MAC) value, permission information, error correction information, version information, or the like. However, some embodiments are not limited to a particular type of metadata that is under consideration for possible representation in the cache.

In an illustrative scenario according to one embodiment, determining at 212 comprises performing an evaluation of whether the data exhibits a pattern—e.g., any of one or more possible patterns—which indicates some threshold amount of data compressibility. By way of illustration and not limitation, the determining at 212 includes evaluating whether the data includes some threshold minimum number of bytes (or words, for example) that are equal to each other. Alternatively or in addition, the determining at 212 includes evaluating whether the data includes some threshold minimum number of consecutive (adjacent) bytes that are equal to each other. Equal bytes (or words) allow for an availability of additional space in a cache line—e.g., where only one instance of the byte (or word) needs to be stored in the cache line. Alternatively or in addition, the determining at 212 includes evaluating whether the data includes some threshold minimum number of bytes that take a special value which is amenable to a particular type of compression. In different embodiments, the determining at 212 is additionally or alternatively based on any of various other such criteria.

Where it is determined at 212 that the data satisfies the predetermined criteria, method 200 (at 214) generates a first representation of both the data and the first metadata. For example, the generating at 214 comprise performing, with one or both of the data and the first metadata, processing which includes a compression operation and/or an encryption operation. In various embodiments, the generating at 214 includes, or is otherwise performed in combination with, the determining of an extension bit value (or other suitable information) which is to be provided in the contents of a cache line as an indicium that said cache line contents include a representation of both the data and the first metadata. For example, such an indicium is to be appended to, or included or otherwise represented in, the representation generated at 214—e.g., wherein an extension bit value (or any of various suitable multi-bit values) is used in a compression operation, an encryption operation and/or other processing which is also based on the data and/or the first metadata. In one embodiment, the cache line contents are to further include or otherwise further represent a multi-bit value as an indicium of whether other metadata is available in the sequestered memory region, whether at least some cache line contents are compressed, whether at least some cache line contents are encrypted, or the like.

Where it is instead determined at 212 that the data does not satisfy the predetermined criteria, method 200 (at 216) generates a second representation of the data—e.g., wherein second representation omits any representation of the corresponding first metadata. Furthermore, method 200 (at 218) stores the first metadata to a sequestered memory region. Similar to the generating at 214, in various embodiments, the generating at 216 includes, or is otherwise performed in combination with, the determining of information to be provided in the contents of a cache line as an indicium that the sequestered memory region stores the first metadata (which is not further represented in said cache line contents). For example, an extension bit or any of various suitable multi-bit values is to be appended to, or included or otherwise represented in, the representation generated at 216.

In some embodiments, regardless of the result of the evaluation at 212, method 200 (at 220) further stores to the cache the representation which was generated at 214 or at 216 (i.e., the generated one of the first representation or the second representation). After the storing at 220, the contents of the cache line include or otherwise further represent an indicium that the contents also represent the first metadata or, alternatively, that the first metadata is stored at the sequestered memory region.

In various embodiments, the sequestered memory region comprises a hash table which includes metadata for various data which is represented in the cache. In one such embodiment, storing the first metadata at 218 includes, or is performed in combination with, the generating of a hash index to correspond the data (and/or the cache line which includes the representation of the data) with a location in the hash table which includes the corresponding first metadata. Alternatively, storing the first metadata at 218 includes, or is performed in combination with, the storing of an entry in a lookup table to define a correspondence of the cache line with a location in the sequestered memory region which stores the first metadata.

Figure 2B:
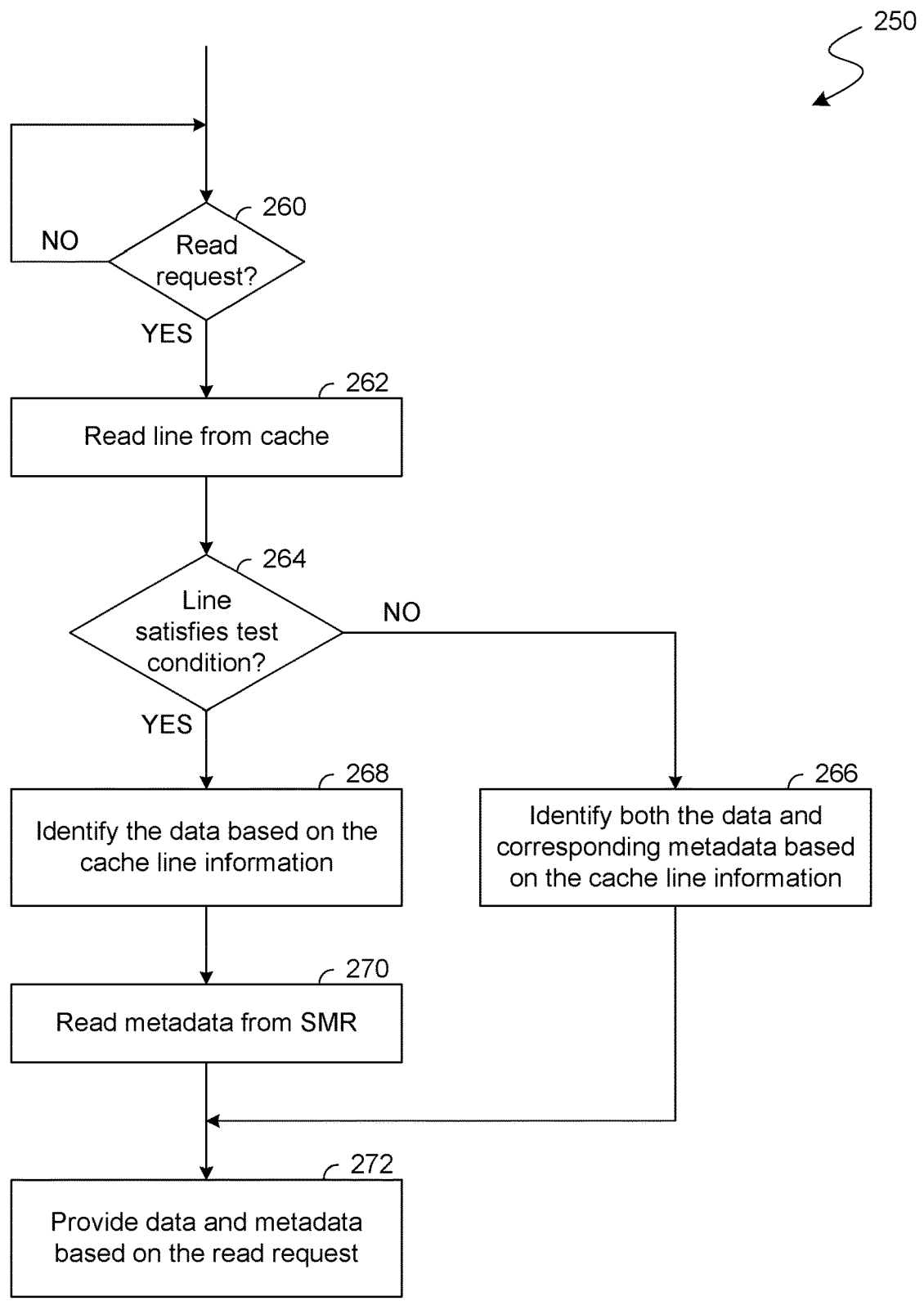
FIG. 2B illustrates a flow diagram showing features of a method to retrieve metadata corresponding to data in a cache line according to an embodiment.

FIG. 2B shows features of a method 250 to access a repository which stores information representing metadata according to an embodiment. Method 200 is one example of an embodiment wherein a line of cache is read, and the contents evaluated to determine whether metadata, corresponding to data which is represented by said contents, is to be retrieved from a sequestered memory region. In an embodiment, method 250 is performed with functionality such as that of system 100—e.g., wherein method 200 includes, or is performed in combination with, method 200.

As shown in FIG. 2B, method 250 comprises (at 260) determining whether a request to read data from a cache has been received. By way of illustration and not limitation, the determining at 260 comprises MDAE 140 determining whether one of cores 106a, . . . , 106n has requested data that is represented in a line of cache 152. Where it is determined at 260 that no such read request is indicated, method 250 repeats the determining at 260 until some read request has been detected.

Where the determining at 260 instead detects a request to read cached data, method 250 (at 262) reads a cache line which includes a representation of the data, and determines (at 264) whether the line satisfies a test condition which is indicative that at least some corresponding first metadata is being stored at a sequestered memory region. By way of illustration and not limitation, the determining at 264 includes processing the information retrieved from the cache line to detect for an extension bit or other suitable indicium of whether (or not) the line includes a representation of both the data and the first metadata. Alternatively, or in addition, such processing includes performing a decompression operation and/or a decryption operation to generate the data (and, for example, the corresponding first metadata).

Where it is determined at 264 that the line does not satisfy the test condition, method 250 (at 266) identifies both the data and the first metadata based on the cache line information which is read at 262. In one such embodiment, the identifying at 266 includes or is otherwise based on a decompression and/or decryption of some or all of the cache line information. Alternatively or in addition, the identifying at 266 is based on some predetermined configuration state—e.g., including reference information—which specifies or otherwise indicates a format according to which the data and the first metadata are to be provided at different respective portions of the cache line (or at different respective portions of information which is generated by processing of the cache line).

Where it is instead determined at 264 that the line satisfies the test condition, method 250 (at 268) identifies the data based on the cache line information—e.g., wherein such identifying at 266 is based on decompression, decryption and/or other processing of some or all of the cache line information. Furthermore, method 250 (at 270) reads the first metadata from the sequestered memory region. By way of illustration and not limitation, the sequestered memory region comprises a hash table which includes the first metadata, wherein a lookup of the hash table is performed with a hash table index which is based on the data and/or the cache line which includes the representation of the data. In some embodiments, the cache line (or information generated by processing of the cache line) includes a pointer to a location of the first metadata in the sequestered memory region. Alternatively or in addition, reading the first metadata at 270 includes accessing a look-up table which specifies or otherwise indicates a correspondence of cache line and/or the data with a location in the sequestered memory region.

In some embodiments, regardless of the result of the determining at 264, method 250 (at 272) further provides the data and the first metadata based on the read request. In some embodiments, both the data and the first metadata are provided (for example, to one of cores 106a, ..., 106n) in a response to the read request. Alternatively, the first metadata and the data are provided to circuitry which determines, based on the first metadata whether (and, if so, how) the data is to be provided in a response to the read request.

Figure 3:
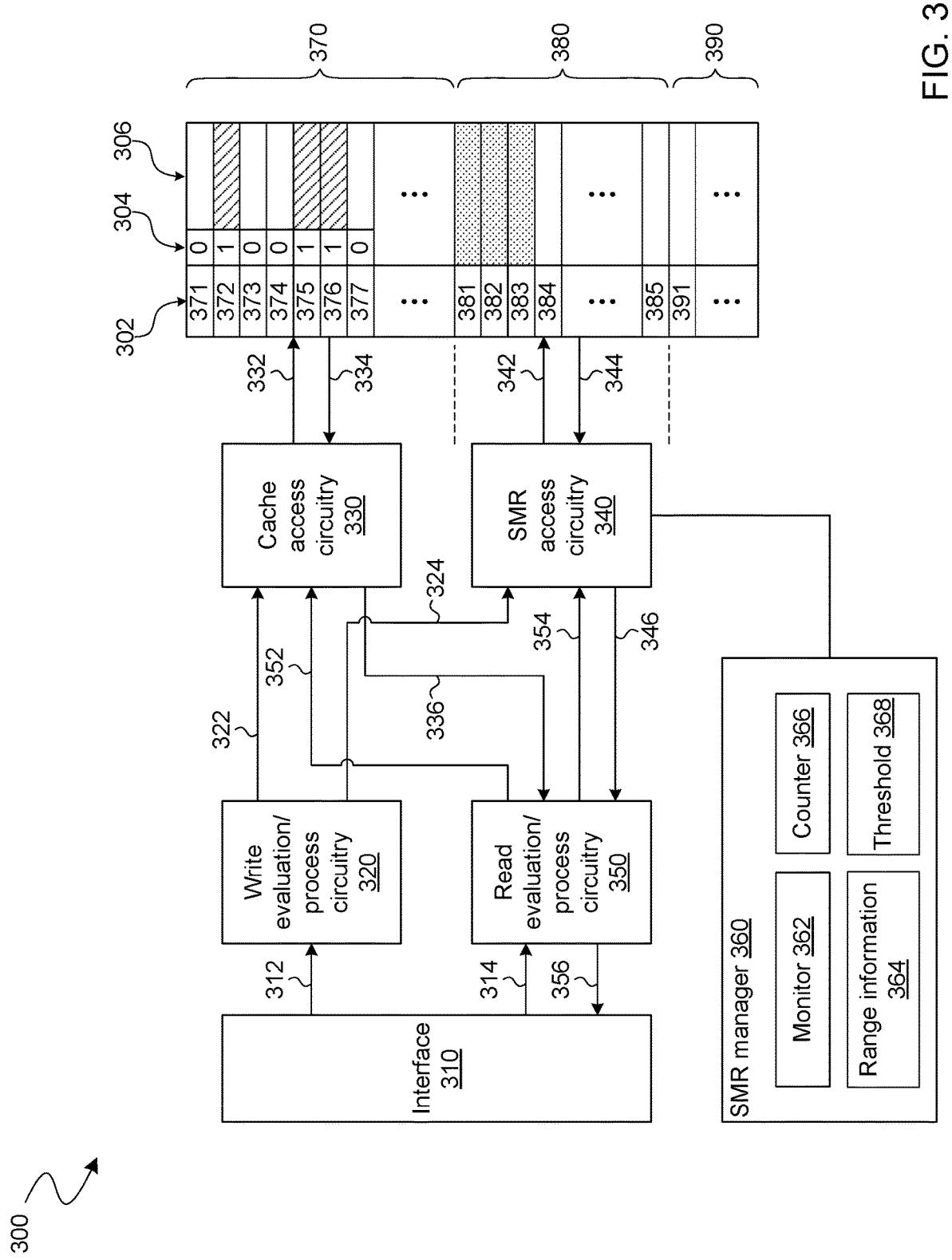
FIG. 3 illustrates a functional block diagram showing features of a system to provide access to data and corresponding metadata according to an embodiment.

FIG. 3 shows features of a device 300 to provide access to data and corresponding metadata according to an embodiment. In various embodiments, device 300 includes features of system 100—e.g., wherein device 300 provides functionality to perform method 200 and/or method 250.

As shown in FIG. 3, device 300 comprises an interface 310, write evaluation/process circuitry 320, read evaluation/process circuitry 350, a cache access circuitry 330, and a SMR access circuitry 340. Interface 310 supports communication with one or more processor cores (such as some or all of cores 106a, ..., 106n). In one such embodiment, write evaluation/process circuitry 320 and read evaluation/process circuitry 350 variously provide functionality of data evaluation circuitry 142 and/or functionality of line process circuitry 144, for example. Alternatively or in addition, cache access circuitry 330 and/or SMR access circuitry 340 provided functionality of such as that of memory controller 110.

In one such embodiment, device 300 further comprises (or alternatively, is to couple to) memory resources which are partitioned or otherwise configured to provide a cache and a sequestered memory region in support of said cache. For example, device 300 facilitates operation of memory regions 370, 380 as a cache and a sequestered memory region (e.g., cache 152 and sequestered memory region 151), respectively.

In the example embodiment shown, lines of a memory (such as memory 150) are addressable each with a respective one of various addresses 302—e.g., wherein some cache lines of memory region 370 correspond to the illustrative addresses 371-377 shown, and where other lines of memory region 370 correspond to the illustrative addresses 381-384, ..., 385 shown. Furthermore, cache lines of memory region 370 each comprise a respective portion 306 which is to store a representation of data (and, in some instances, of metadata corresponding to said data). In one such embodiment, cache lines of memory region 370 are to further store or otherwise represent values—such as the illustrative extension bits 304 shown—which each specify or otherwise indicate whether memory region 380 stores metadata corresponding to the data represented in that cache line.

By way of illustration and not limitation, FIG. 3 shows a state of device 300 during which the cache lines at addresses 371, 373, 374, and 377 each store a respective representation of both data and metadata which corresponds to said data. For each such cache line, the exclusion bit thereof is set to a value (in this example, "0") which indicates that memory region 380 does not store any corresponding metadata for the represented data. By contrast, the cache lines at addresses 372, 375, and 376 each store a respective representation of data, but not of at least some corresponding metadata (which is instead stored or otherwise represented in memory region 380). For each such cache line, the exclusion bit thereof indicates (e.g., with a "1" value) that memory region 380 stores at least some metadata corresponding to the represented data—e.g., wherein the lines at addresses 381, 382, 383 each store a respective metadata value.

In one example scenario according to an embodiment, write evaluation/process circuitry 320 receives from interface 310 a message 312 which indicates that some first data is to be cached—e.g., wherein message 312 comprises the first data and some first metadata which corresponds to the first data. Based on message 312, write evaluation/process circuitry 320 performs an evaluation (such as that at 212 of method 200) which, in the example scenario, determines that a line of memory region 370 is able to accommodate a first representation of both the first data and the first metadata. Based on such determining, write evaluation/process circuitry 320 performs one or more operations (e.g., including a concatenation of the first data with the first metadata, a compression of the first data and/or the first metadata, an encryption and/or the like) to generate such a first representation of both the first data and the first metadata. Then write evaluation/process circuitry 320 communicates the first representation in a message 322 to cache access circuitry 330—e.g., wherein, based on message 322, cache access circuitry 330 generates signals 332 to store the first representation to a line of memory region 370.

In another illustrative scenario, message 312 indicates to write evaluation/process circuitry 320 that some second data is to be cached—e.g., write evaluation/process circuitry 320 instead determines, based on the second data, that a line of memory region 370 is unable to accommodate a representation of both the second data and some second metadata which corresponds that second data. Based on such determining, write evaluation/process circuitry 320 instead generates a second representation of the data (but not, for example, of the second metadata as well). In one such embodiment, generating the second representation comprises write evaluation/process circuitry 320 concatenating the data with an exclusion bit or other suitable indicium that the second metadata is to be available at memory region 380. In some embodiments, generating the second representation further comprises write evaluation/process circuitry 320 compressing, encrypting and/or otherwise processing the second data. Write evaluation/process circuitry 320 then communicates the second representation via message 322 to cache access circuitry 330—e.g., wherein, based on message 322, cache access circuitry 330 generates signals 332 to store the second representation to a line of memory region 370. Furthermore, write evaluation/process circuitry 320 communicates the second metadata in a message 324 to SMR access circuitry 340, wherein SMR access circuitry 340 generates signals 342 to store the second metadata to a line of memory region 380.

As a result of such selective writing to a sequestered memory region, some embodiments provide different types of access to various instances of metadata which are each of a same metadata type. In an illustrative scenario according to one embodiment, at a given time, a first cache line of memory region 370 stores a representation of both first data and first metadata which corresponds to the first data, wherein the first metadata is of a particular metadata type (e.g., one of an error correction type, a media access control value type, a user privilege information type, or the like). At that same given time, a second cache line of memory region 370 stores a representation of second data, while memory region 380 stores some second metadata which corresponds to the second data, wherein the second metadata and the first metadata are each of that same particular metadata type. In one such embodiment, the selective storing of the second metadata to memory region 380, but not also the first metadata is due, for example, to difference between the respective sizes and/or the respective compressabilities of the first data and the second data.

In an example scenario according to another embodiment, device 300 performs operations to provide both data and metadata based on a read of a cache line in memory region 370. By way of illustration and not limitation, read evaluation/process circuitry 350 receives from interface 310 a message 314 which (for example) requests the first data described above with reference to a different scenario. Based on message 314, read evaluation/process circuitry 350 retrieves cached information which represents the first data—e.g., wherein a message 352 from read evaluation/process circuitry 350 requests that cache access circuitry 330 search memory region 370 for said representation. In response to message 352, cache access circuitry 330—e.g., using operations adapted from conventional cache look-up techniques—identifies a cache line which includes the first representation of the first data (and, in this case, of the first metadata which corresponds to the first data). Cache access circuitry 330 then generates signals 332 to read the first representation, which in turn is provided to cache access circuitry 330 via signals 334. Cache access circuitry 330 then communicates the first representation to read evaluation/process circuitry 350 via message 336. In some embodiments, read evaluation/process circuitry 350 performs an evaluation (such as that which is performed at 264 of method 250) which identifies that the first representation represents both the first data and the first metadata. Based on a determination that no other metadata associated with the first data needs to be retrieved from the sequestered memory region 380, read evaluation/process circuitry 350 provides the first data and the first metadata in a message 356 to interface 310.

In still another scenario according to an embodiment, message 314 instead requests the second data which is described above with reference to a different scenario. Based on such a message 314, various communications—e.g., including message 352, signals 332, signals 334, and signals 336—are performed to instead provide read evaluation/process circuitry 350 with the above-described second representation of the second data (but not of the second metadata which corresponds to the second data). Read evaluation/process circuitry 350 then performs an evaluation of the second representation (such as that performed at 264 of method 250), which identifies that the second representation represents the second data, but not the second metadata. Read evaluation/process circuitry 350 thereby detects that the second metadata is to be read from memory region 380. Based on such detecting, read evaluation/process circuitry 350 communicates a message 354 which requests that SMR access circuitry 340 access the second metadata in memory region 380. Based on message 354, signals 342, 344 are variously communicated for SMR access circuitry 340 to read the second metadata, which is then communicated to read evaluation/process circuitry 350 via a message 346. Read evaluation/process circuitry 350 provides the second data and the second metadata in a message 356 to interface 310.

Although some embodiments are not limited in this regard, device 300 further comprises circuitry (such as the illustrative SMR manager 360 shown) which, for example, provides functionality to identify the bounds of memory region 380, and/or to provide a utilization metric which is used to change said bounds. In one such embodiment, SMR manager 360 provides functionality such as that of monitor circuitry 146. For example, SMR manager 360 includes or otherwise has access to range information 364 which identifies that, at least during the state shown, memory region 380 includes the lines from address 381 to address 385. In various embodiment, range information 364 is based on a setting of one more mode registers by a BIOS process, an operating system, and/or other software which facilitates an allocation (e.g., including a reallocation) of memory resources.

As metadata is variously written to, read from or otherwise accessed at memory region 380, a monitor 362 of SMR manager 360 detects such accessing—e.g., by snooping or otherwise detecting signals communicated to, from or within SMR access circuitry 340. Based on the detected accesses to memory region 380, monitor 362 keeps up-to-date one or more values which each represent a respective metric of the utilization of SMR manager 360. For example, monitor 362 maintains an updated value of a counter 366 which specifies or otherwise indicates a current count of available lines (or portions thereof) in memory region 380 which are not currently storing metadata for valid data represented in memory region 370. In some embodiments, monitor 362 (or other suitable circuitry of SMR manager 360) makes some or all such utilization metrics available to an operating system or other software process—e.g., wherein, based on one or more utilization metrics, the software changes the bounds of memory region 380. In one example scenario, memory region 380 is extended to further include one or more lines in another memory region 390.

Figure 4:
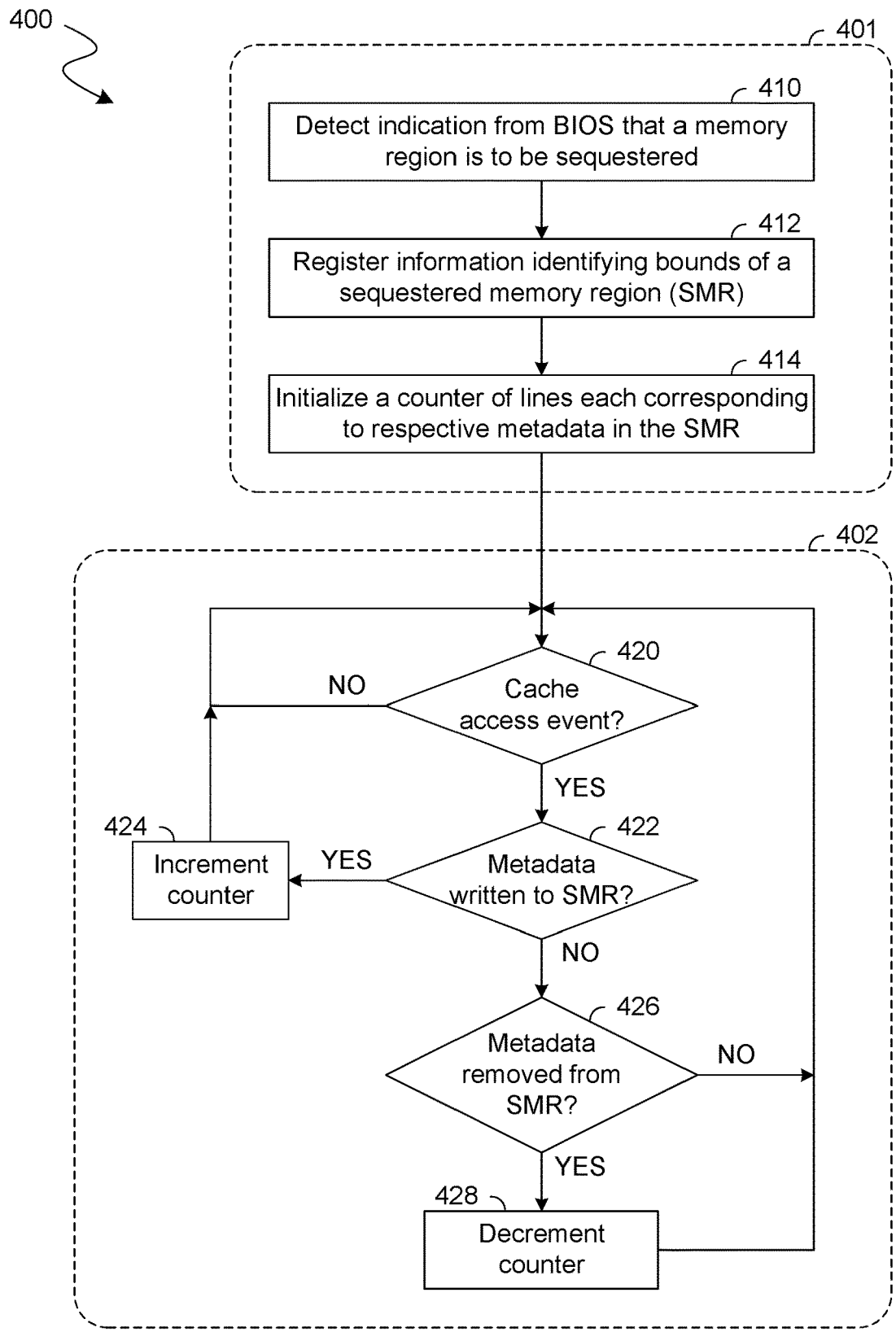
FIG. 4 illustrates a flow diagram showing features of a method to provide a sequestered memory for storing metadata according to an embodiment.

FIG. 4 shows features of a method 400 to provide a sequestered memory for storing metadata according to an embodiment. In an embodiment, method 400 is performed with functionality such as that of system 100 or device 300—e.g., wherein method 200 includes, or is performed in combination with, some or all of method 400.

As shown in FIG. 4, method 400 comprises operations 401 to sequester a memory region for use in storing metadata which corresponds to other data that is cached in another memory region. Operations 401 comprise (at 410) detecting an indication from a binary input/output system (BIOS) that a memory region is to be sequestered. For example, the BIOS indicates to memory mapping circuitry—e.g., during a boot up sequence—that some memory resources are to be initially allocated for use as a sequestered memory such as sequestered memory region 151 or memory region 380. In an embodiment, the initially allocated space is some default size (such as 16 megabytes, for example).

Based on such the indication detected at 410, information is provided (at 412) to one or more mode registers and/or other suitable circuitry, to define the bounds of the sequestered memory region. For example, the registering at 412 enables MDAE 140 (or other such circuitry) to identify where metadata is to be stored, under various conditions, for data that is represented in a cache. In some embodiments, the detecting at 410 and/or the registering at 412 include operations which are adapted from conventional memory mapping techniques. Subsequently (at 414) operations 401 initialize a counter (such as counter 366) which is to specify or otherwise indicate a current count of currently used (or alternatively, unused) lines, bytes, words, or other portions of the sequestered memory region.

Additionally, or alternatively, method 400 comprises operations 402 to maintain an updated count value (e.g., using a counter such as the one which is initialized at 414) which is to serve as a metric of utilization of a sequestered memory region. In the example embodiment shown, operations 402 comprise (at 420) determining whether a next cache access event has taken place (or is to take place). For example, the detecting at 420 comprises data evaluation circuitry 142 (or one of write evaluation/process circuitry 320 or read evaluation/process circuitry 350) detecting whether data is being provided for caching, or whether a request has been received to read a line of the cache. Where it is determined at 420 that no such next access event is indicated, operations 402 repeat the determining at 420 until such an event is detected.

Where it is instead determined at 420 that a next access event is indicated, operations 402 determine (at 422) whether some metadata—corresponding to data which is to be represented in the cache—has been (or is to be) written to the sequestered memory region. Where such writing of metadata to the sequestered memory is indicated at 422, operations 402 increment (or otherwise update) the counter accordingly (at 424), and return to detecting for a next cache event at 420. Where it is instead determined at 422 that no addition of metadata to the sequestered memory is indicated, operations 402 determine (at 426) whether metadata has been removed (or is to be removed) from the sequestered memory region. For example, metadata is to be automatically removed based on an eviction of a corresponding line from the cache, in some embodiments.

Where it is determined at 426 that no such removal of metadata is indicated, operations 402 return to detecting for a next cache event at 420. By contrast, where it is instead determined at 426 that metadata has been (or is to be) removed from the sequestered memory region, operations 402 (at 428) decrement or otherwise update the counter accordingly, and return to detecting for a next cache event at 420.

Figure 5:
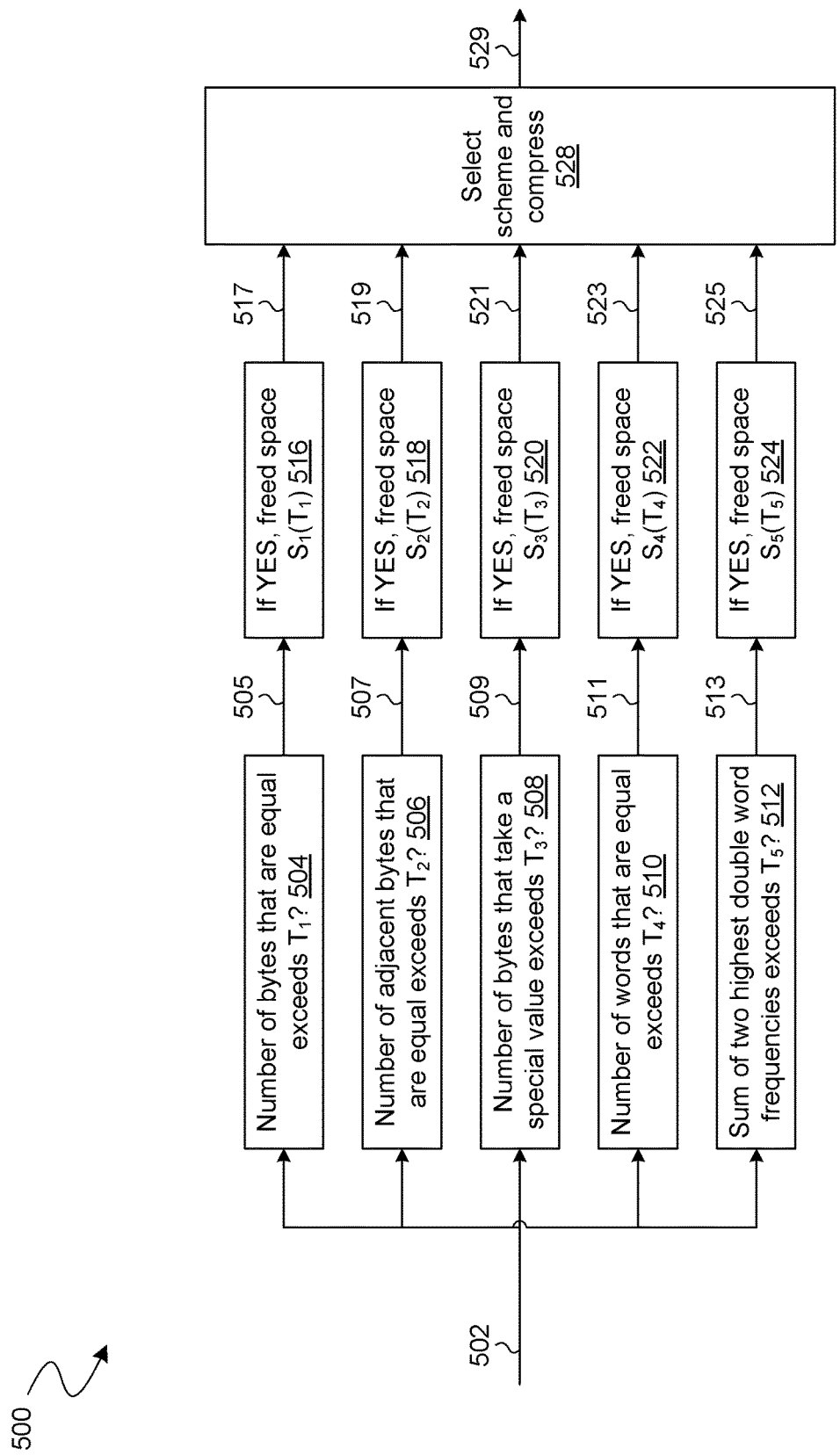
FIG. 5 illustrates a functional block diagram showing features of a device to determine whether a line of a cache is to store both data and corresponding metadata according to an embodiment.

FIG. 5 shows features of a device 500 to determine whether a line of a cache is to store both data and corresponding metadata according to an embodiment. Device 500 is one example of an embodiment wherein any of a variety of criteria are used for determining whether a line of cache is able to accommodate a representation of both data and some particular metadata which corresponds to said data. In various embodiments, device 500 includes features of data evaluation circuitry 142, or write evaluation/process circuitry 320—e.g., wherein functionality of device 500 is provided according to method 200.

As shown in FIG. 5, device 500 comprises circuitry to detect whether data to be represented in a line of cache satisfies any of various criteria—e.g., wherein a given criteria includes a particular data pattern that (for example) is indicative of a compressability of the data. A variety of patterns are considered by the device 500. Patterns include subsets of data, such as bytes, words, nibbles, or double words being equal to each other. Patterns include the subsets of the data being equal to each other, adjacent data being equal to each other, data being equal to special values, such as a minimum value (e.g., 0x00) or maximum value (e.g., 0xFF), or value histograms demonstrating sums of n highest data being higher than a threshold.

The device 500 includes determining whether a number of bytes of input data 502 which are equal to each other exceeds a threshold $T_1$, at functional block 504. The device 500 determines whether a number of adjacent bytes of the input data 502 which are equal to each other exceeds a threshold $T_2$, at functional block 506. The device 500 includes determining whether a number of bytes of the input data 502 of a specific value exceeds a threshold $T_3$, at functional block 508. The device 500 further determines whether a number of words of the input data 502 that are equal to each other exceeds a threshold $T_4$, at functional block 510. The device 500 further determines whether a sum the two highest double frequencies of the input data 502 exceeds a threshold $T_5$, at functional block 512. The functional blocks 504, 506, and 508 operate on bytes (eight consecutive bits). The functional blocks 510 and 512 operate on words (sixteen consecutive bits) or double words (thirty-two consecutive bits). Data blocks (e.g., double-word, word, byte, nibble, etc.) are aligned to the input data 502.

In response to determining, at functional block 504, that the number of bytes that are equal to each other exceeds $T_1$ (as indicated on line 505), an amount of space freed by compressing the bytes that are equal to each other is determined, at functional block 516. In response to determining, at functional block 506, that the number of adjacent bytes that are equal to each other exceeds $T_2$ (as indicated on line 507), an amount of space freed by compressing the adjacent bytes that are equal to each other is determined, at functional block 518. In response to determining, at functional block 508, that the number of bytes that are equal to a specific value exceeds $T_3$ (as indicated on line 509), an amount of space freed by compressing the bytes that are equal to the specific value (e.g., 0x00, 0xFF, or the like) is determined, at functional block 520.

In response to determining, at functional block 510, that a number of words (or double words) that are equal to each other exceeds T4 (as indicated on line 511), an amount of space freed by compressing the words that are equal to each other is determined, at functional block 522. In response to determining, at functional block 512, that the sum of the two highest double word frequencies exceeds T5 (as indicated on line 513), an amount of space freed by compressing the double words corresponding to the two highest double word frequencies is determined, at functional block 524.

Each of the amounts determined at functional blocks 516, 518, 520, 522, or 524 is provided to determine how to compress the input data 502, at functional block 528. The freed space is provided on lines 517, 519, 521, 523, and 525. The resulting output 529 is provided in response to functional block 528.

The processing provided by device 500 enables compression of the relatively small amount of data which is typical provided in a cache line. The freed space is enough for such a given cache line to further represent, in addition to data, corresponding metadata such as 32-bit or 64-bit truncated MAC, access control information, security policy metadata, or the like. Many of the embodiments are also efficient to implement in hardware. One or more embodiments require no more than 1-3 clock cycles for decompression and 2-8 clock cycles for compression. In various embodiments, device 500 provides a pipelined implementation of single clock throughput, incurring a reasonably small area cost in hardware.

Figure 6:
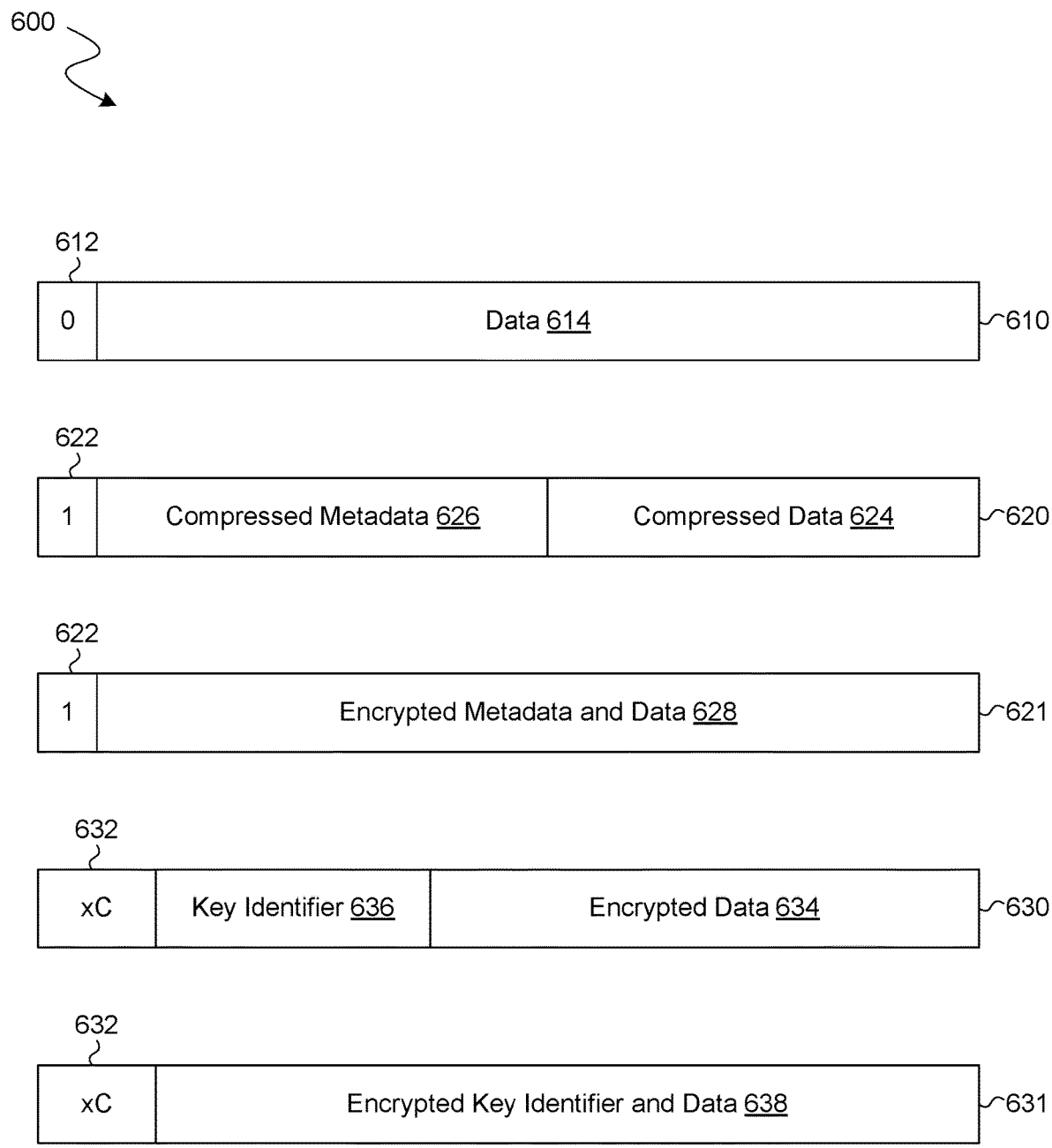
FIG. 6 illustrates a data diagram showing features of information which is generated to provide access to metadata according to an embodiment.

FIG. 6 shows a block diagram 600 illustrating various representations of data (and, for example, corresponding metadata) each to be included in respective cache line according to a corresponding embodiment. Information such as that illustrated in block diagram is generated, written, read and/or otherwise accessed by system 100 or device 300—e.g., wherein such accessing is according to one of methods 200, 250.

Block 610 represents contents of a cache line which accommodates a representation of data 614, but not a representation of both data 614 and at least some metadata which corresponds to data 614. To facilitate the accessing of such metadata in a sequestered memory region, block 610 further comprises an extension bit 612, the value of which (in this example, "0") indicates that the metadata is not represented in block 610.

Block 620 represents contents of a cache line which accommodates a representation of both compressed data 624 and compressed data metadata 626 which corresponds to the compressed data 624. Any of a variety of publicly available compression algorithms is used, for example, for compressing data and/or metadata to generate block 620. To indicate that block 620 includes a representation of metadata corresponding to the compressed data 624, block 610 further comprises an extension bit 622, the value of which (e.g., "1") indicates that the metadata does not need to be retrieved from some sequestered memory region. Block 621 represents an alternative version of block 620—e.g., wherein encrypted metadata and data 628 of block 621 is generated by an encrypting of compressed data 624 and compressed data metadata 626. Any of a variety of publicly available cryptographic algorithms is used, for example, for encrypting data and/or metadata to generate block 621.

Block 630 represents contents of a cache line which accommodates encrypted data 634, but not both encrypted data 634 and a representation of at least some metadata which corresponds to encrypted data 634. To facilitate the accessing of such metadata in a sequestered memory region, block 630 further comprises a key identifier 636 which, for example, facilitates accessing the metadata in a hash table structure of a sequestered memory region. By way of illustration and not limitation, MDAE 140, read evaluation/process circuitry 350 or other suitable circuit resource reads and processes the cache line represented by block 630 to determine key identifier 636. In one such embodiment, the circuit resource includes, is coupled to access, or otherwise uses a look-up table, hash function, or other suitable mechanism to determine a hash table index for accessing the hash table structure. In some embodiments, block 630 additionally or alternatively includes a multi-bit field 632, the value of which specifies or otherwise indicates one or more characteristics of other contents of block 630 (e.g., wherein such other contents include key identifier 636 and/or encrypted data 634). In one such embodiment, the value of multi-bit field 632 identifies whether the other contents are compressed, whether the other contents are encrypted, whether the other contents represent metadata, and/or the like. Block 631 represents an alternative version of block 630—e.g., wherein the encrypted key identifier and data 638 of block 631 is generated by a further encrypting of encrypted data 634 with key identifier 636.

Figure 7:
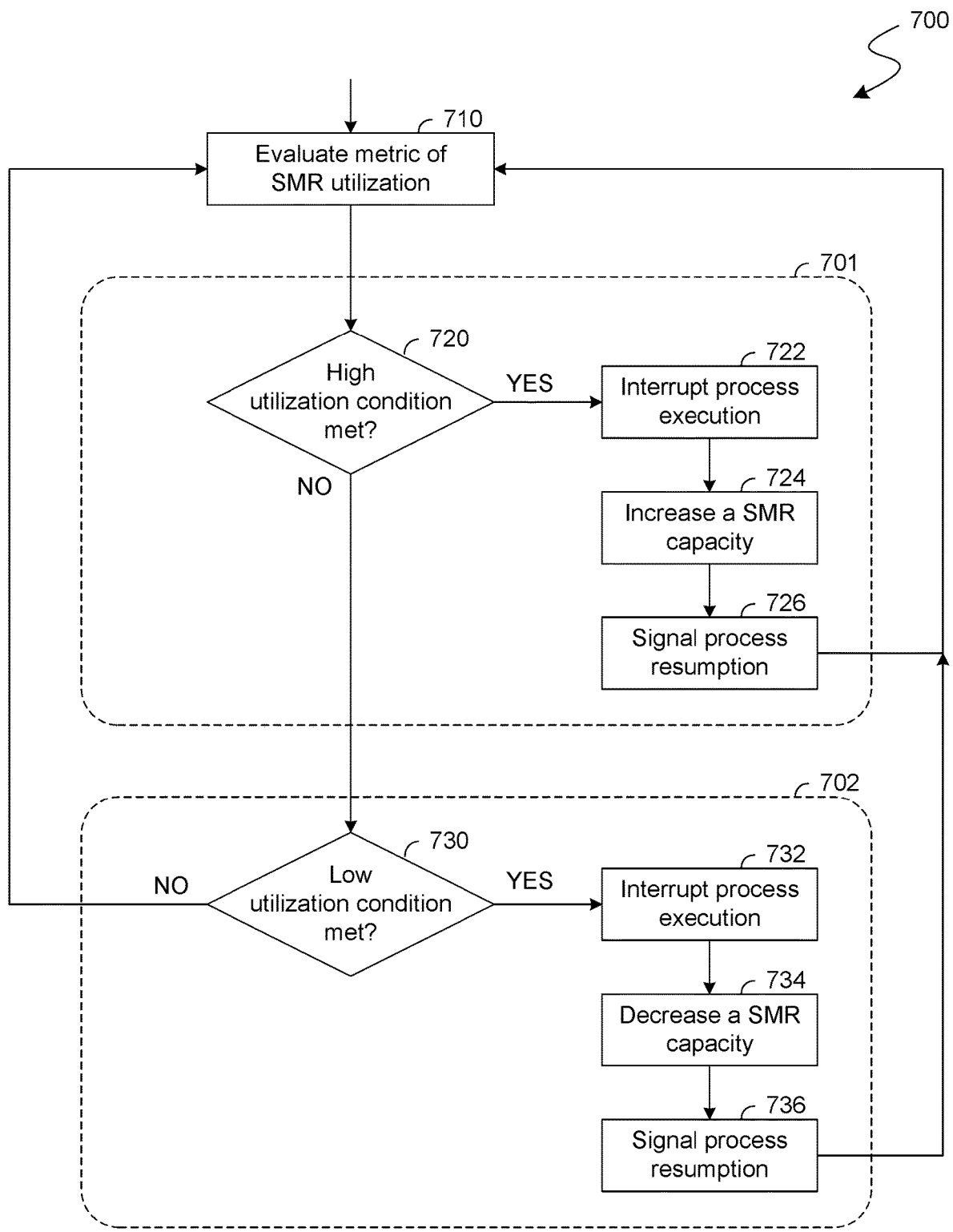
FIG. 7 illustrates a flow diagram showing features of a method to change a capacity of a sequestered memory region according to an embodiment.

FIG. 7 shows features of a method 700 to change a capacity of a sequestered memory region according to an embodiment. In an embodiment, method 700 is performed with a software process which is executed by one of processor cores 106a, . . . , 106n—e.g., wherein method 700 uses metric information that is generated based on method 200 or method 250.

In some embodiments, method 700 comprises operations 701 to conditionally increase a capacity of a sequestered memory region, and/or other operations 702 to conditionally decrease a capacity of such a sequestered memory region. Some embodiments are not limited as to whether operations 701 precede, or alternatively follow, operations 702.

As shown in FIG. 7, method 700 comprises (at 710) evaluating a metric of utilization of a sequestered memory region. For example, monitor circuitry 146, SMR manager 360 or other such circuit resources provide to executing software one or more metrics which—for example—include or are otherwise based on a count of currently unused (or alternatively, currently used) portions of the sequestered memory region. In one such embodiment, the one or more metrics specify or otherwise indicate a rate of change—e.g., one or more of a first order rate of change, a second order rate of change, etc.—of a capacity of unused portions of the sequestered memory region.

Operations 701 comprise (at 720) determining whether the evaluating at 710 indicates some predetermined condition of high utilization of the sequestered memory region—e.g., wherein the utilization is at or above an upper threshold level. For example, the determining at 720 includes detecting whether a number of available (e.g., unused) portions of the sequestered memory region is low, according to some predetermined criteria. Alternatively or in addition, the determining at 720 includes detecting whether such a number is decreasing at a rate which, according to another predetermined criteria, is too high. Criteria to be used in the determining at 720 vary significantly across different embodiments according to implementation-specific details, and some embodiments are not limited to a particular one or more such criteria.

Where it is determined at 720 that a high utilization condition is indicated, operations 701 (at 722) interrupt the execution of one or more software processes which variously cache data (for which metadata is variously stored, conditionally, in the sequestered memory region). Furthermore (at 724) operations 701 increase a capacity of the sequestered memory region while the one or more software processes are interrupted. For example, the increasing at 724 includes an operating system, a virtual machine (VM) or a virtual machine manager (VMM) updating one or more mode registers and/or other repositories of values such as those of range information 364. Further still (at 726), operations 701 signal to processor circuitry (such as that of cores 106a, . . . , 106n) that execution of the one or more software processes is to resume, after which method 700 returns to repeat the evaluating at 710.

Where it is instead determined at 720 that the high utilization condition is not indicated, operations 702 (at 730) determine whether the evaluating at 710 indicates a condition of low utilization of the sequestered memory region—e.g., wherein the utilization is at or below a lower threshold level. For example, the determining at 730 includes detecting whether, according to one or more predetermined criteria, a number of available portions of the sequestered memory region is high, and/or whether such a number is increasing at a rate which is deemed too high. Such one or more criteria vary significantly across different embodiments according to implementation-specific details, and are not limiting on said embodiments.

Where it is determined at 730 that no such low utilization condition is indicated, method 700 returns to repeat the evaluating at 710. By contrast, where it is instead determined at 730 that a low utilization condition is indicated, operations 702 (at 732) interrupt the execution of one or more software processes which variously cache data, resulting—conditionally—in the storage of metadata to the sequestered memory region. Furthermore (at 734) operations 702 decrease a capacity of the sequestered memory region while the one or more software processes are interrupted. Further still (at 736), operations 702 signal to the processor circuitry that execution of the one or more software processes is to resume, after which method 700 returns to repeat the evaluating at 710.

Some embodiments provide a collision-free approach to build in a sequestered memory region a hash table for use in storing metadata. Such metadata includes, but is not limited to, error detection/correction information, permission bits, policy metadata, MACs, Integrity Check Values, and so on. Said embodiments variously enable a collision-free approach to access metadata from such a hash table. Such a hash table supports open addressing, in some embodiments—e.g., wherein entries of the hash table each include a respective one or more key-value pairs. In various embodiments, access to a hash table is facilitated with a plurality of cryptographically-strong hash functions that, for example, combine additions with carries, bit-level reordering, and bit-linear mixing that differs for each of the plurality of hash functions, and wide substitutions over a small number of rounds. In some embodiments, the plurality of hash functions are keyed hash functions that share operations comprising the additions with carries, the bit-level reordering, and the wide substitutions, but utilize different keys.

Figure 8:
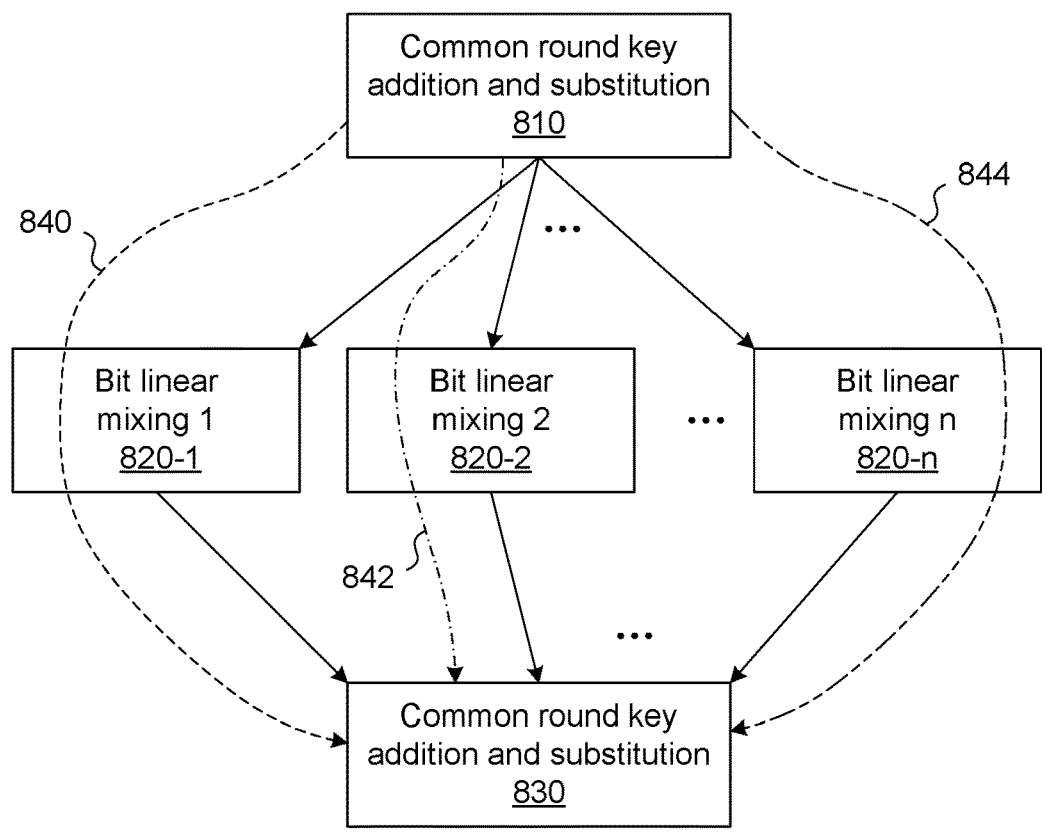
FIG. 8 illustrates a flow diagram showing features of a method to provide access to metadata with a hash table according to an embodiment.

For example, referring now to FIG. 8, a schematic diagram details an example hash function processes 800 for collision-free hashing for accessing metadata in accordance with an embodiment. In one implementation, the hash function processes 800 is utilized by line process circuitry 144 of system 100 (or, for example, by write evaluation/process circuitry 320 and/or read evaluation/process circuitry 350) to generate a plurality of N different hash functions that are used to resolve to locations of a hash table—e.g., in one of sequestered memory region 151 or memory region 380. The value of "N" varies across different embodiments depending on the particular implementation of the hash table and hash function processes. For example, the N different hash functions of hash function processes 800 are shown as hash function 1 840, hash function 2 842, and so on, through hash function N 844.

In the example hash function processes 800, a first stage 810 is common round key addition and substitution. In one implementation, the round key addition and substitution of the first stage 810 are referred to as "common" because the round key addition and substitution processing can be applied uniformly in each of the N different hash functions 840, 842, 844 generated using hash function processes 800. The common round key addition and substitution of the first stage 810 includes a plurality of processes including, but not limited to, additions with carriers, bit-level reordering, and wide substitutions. The common round key addition and substitution of the first stage 810 utilizes secret information, such as a key, to tweak the computation of the hash function. Further details regarding the common round key and substitution process are discussed below with respect to FIG. 9.

The first stage 810 is followed by a second stage 820 of bit linear mixing. The second stage 820 (i.e., collectively referring to bit linear mixing 1 820-1, bit linear mixing 2 820-2, through bit linear mixing N 820-N) of bit linear mixing can differ for each hash function 840, 842, 844 generated using hash function processes 800. For example, a first hash function 1 840 of the plurality of hash functions uses bit linear mixing 1 820-1 operations, a second hash function 2 842 of the plurality of hash functions uses bit linear mixing 2 820-2 operations, and so on until the final hash function N 844 uses bit linear mixing N 820-N operations. This differentiation at the second stage 820 using bit linear mixing is provided for the plurality of N different hash functions 840, 842, 844 by hash function processes 800. The bit linear mixing process of the second stage 820 refers to multiplying an input vector with a matrix that results in an output vector of smaller dimensionality. Further details regarding the bit linear mixing process are discussed below with respect to FIG. 9.

In some embodiments, the second stage 820 is followed by a third stage 830 of another set of common round key addition and substitution processes. The common round key addition and substitution of the third stage 830 includes a plurality of processes including, but not limited to, additions with carriers, bit-level reordering, and wide substitutions. Further details regarding the common round key and substitution process are discussed below with respect to FIG. 9.

Figure 9:
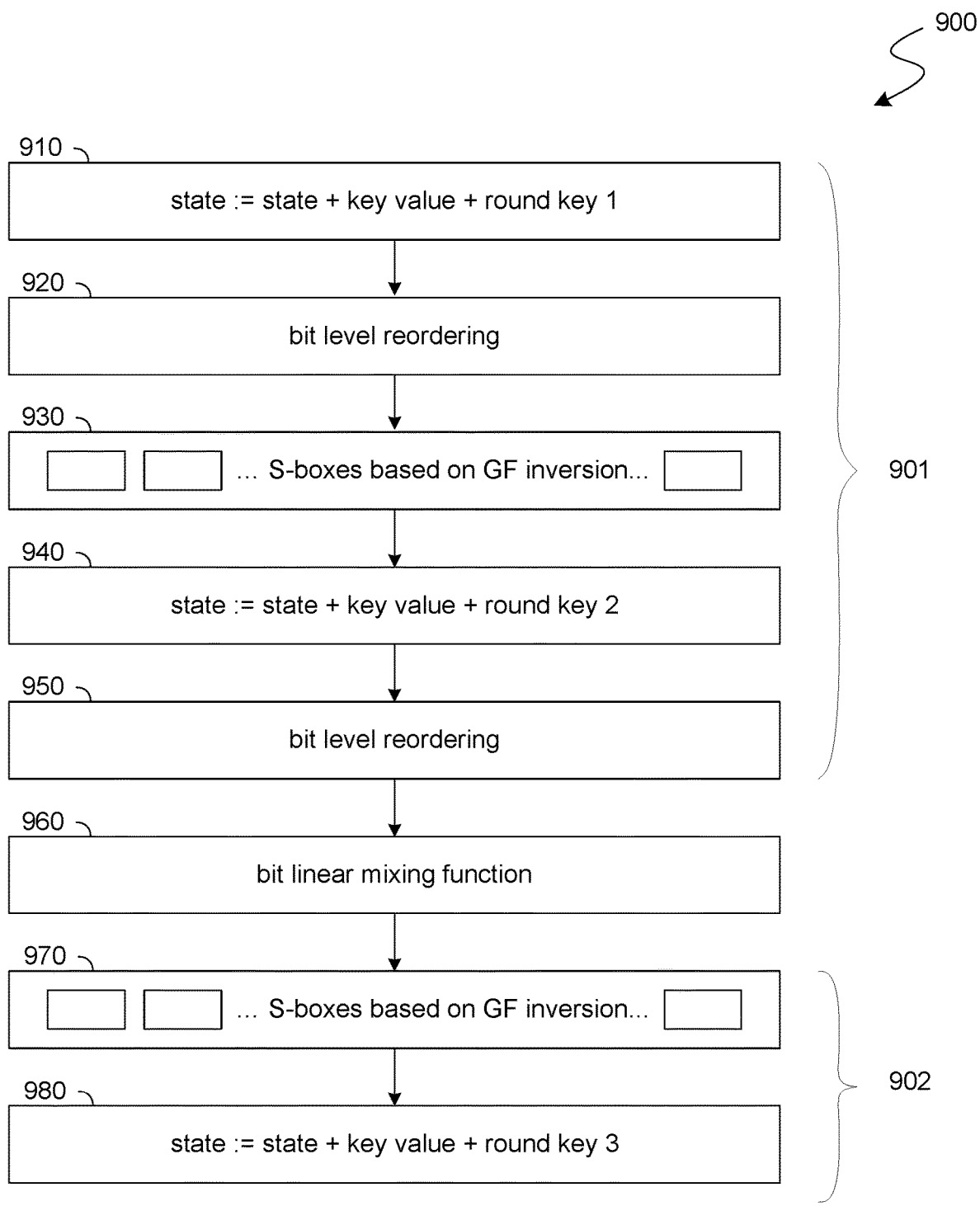
FIG. 9 illustrates a functional block diagram showing features of a method to represent metadata using a hash function according to an embodiment.

FIG. 9 illustrates a flow diagram of an example hash function 900 implementing collision-free hashing for accessing metadata in accordance with some embodiments. Hash function 900 is one example implementation of hash function processes 800 described with respect to FIG. 8. Although shown in a particular order, the processes and/or stages of hash function 900 are ordered in a different combination or sub-combination and are not limited to the particular order or set of processes described herein. In one implementation, the hash function 900 is utilized by line process circuitry 144 of FIG. 1 to generate a plurality of N different hash functions that are used to resolve to locations in a hash table that, for example, is provided at sequestered memory region 151.

Hash function 900 begins with a first stage 910 of adding. The addition of the first stage 910 takes as input a state, and then adds to this state a value of a supplied key and a first round key. The addition performed is, for example, integer arithmetic. Integer addition, if seen as a bit-logical operation, performs strong mixing of its input bits, in order to produce the bits of the output. The mixing performed demonstrates regularity due to the use of carry values. The term "mixing" refers to computations on single bit values that involve a plurality of AND, OR, NAND, NOR or XOR operations. The addition with carries of the first stage 910 can be a bit length independent operation. As such, its specification is independent of the length of the inputs. It is also invertible, its inverse being the subtraction with borrows. In one implementation, any final carry out or borrow out signals produced from such operations can be ignored.

To remove the regularity which characterizes the addition with carries at the first stage 910, a second stage 920 of bit level reordering is performed on the addition output of the first stage 910. Such bit level reordering operation of the second stage 920 places the output bits coming from the first stage 910 in a seemingly random order, so that the number of Galois Field GF(2) products of the logic equation of the result no longer increases monotonically, but instead increases and decreases in a pseudorandom manner.

Furthermore, the bit level reordering operation of the second stage 920 aids the subsequent wide substitution stage of the third stage 930, contributing to each bit of the output of the hash function 900 resulting from mixing all bits of the input with all bits of the key. The wide substitution of the third stage 930 is a substitution box (S-box) layer that is based on GF conversion.

In one example, the S-box layer of the third stage 930 operates as follows. First, the S-box layer divides its input N bits into blocks of M bits. It can be assumed that N is a multiple of M. The cases where N is not a multiple of M are discussed further below. If N is a multiple of M, the S-box layer can employ an array of N=M inverters in $GF(2^M)$ arithmetic which replace their input bits with the bits of the inverse in $GF(2^M)$. Inversion in the Galois Field arithmetic $GF(2^M)$ is an operation that supports strong bit mixing. The mixing performed by the Galois Field inverters employed by the hash function 900 does not demonstrate the regularity of addition with carries and is in fact pseudo-random. Hash function 900 is designed to support strong encryption security by employing additions and inversions in two unrelated types of arithmetic (i.e., Galois Field and integer) and by combining those into sequences of few rounds.

The S-box layer of the third stage 930 is bit length independent provided that the length of the state of the cipher N is a multiple of the width of the inverters employed M. In this case, the specification of the cipher is generic and each wide substitution stage employs N=M inverters. If N is not a multiple M, then there are m substitution boxes of width M that are employed, plus one more of width K=(N—m)*M, where K is non-zero. In one implementation, the substitution stage of the S-box layer of the third stage 930 can employ m inverters in the $GF(2^M)$ arithmetic and one inverter in the GF(2K) arithmetic handling the last K bits of the cipher state.

The processing of hash function 900 employs at least two rounds of adding and bit level reordering. As such, a fourth stage 940 of hash function 900 includes a second process of round key addition, where a second round key is added to an input state, similar to the process described with respect to the first stage 910. At the fifth stage 950, a second round of bit level reordering is performed on the output of the addition of the fourth stage 940.

The sixth stage 960 takes the output of the fifth stage 950 and performs a bit linear mixing function on the output. While the set 901 of stages 910-950, and the set 902 of stages 970-980 of hash function 900 are the same for each iteration of hash function 900, the bit linear mixing function at stage 960 differs for each iteration of the hash function generated by hash function 900. The bit linear mixing refers to matrix multiplication, where the input vector to the bit linear mixing function is multiplied with a matrix that results in an output vector of smaller dimensionality. The matrix used to multiply against the input vector differs, in some embodiment, for each iteration of hash function 900.

As noted above, the output of the bit linear mixing function of the sixth stage 960 includes a state length that is reduced to an output index length. The seventh stage 970 of the hash function 900 receives this output and applies another wide substitution using S-boxes based on GF inversion. This stage is similar in operation to the third stage 930 described above. The final eighth stage 980 perform a final round key addition using a third round key with an input state provided to the eighth stage 980.

In one implementation, the generation of the index sequences employed by the hash function 900, which support bit level reordering, such as at stages 920, 950, can be accomplished by the following index sequence process: The index sequence process first determines the number of times d it should iterate over the bits of a substitution box in order to distribute these bits over all substitution boxes. These bits of a substitution box are referred to as "bits-to-be-reordered". The parameter d is equal to ceil(M/b). Then, for each of the d iterations, the algorithm generates a random sequence of numbers. These are the indexes of the substitution boxes where the "bits-to-be-reordered", associated with the current iteration, are to be placed. Subsequently, for each "bit-to-be-reordered", the index sequence process picks a bit position at random from among the empty bit positions in the input bit's target substitution box and assigns this position to the bit. This last step can be repeated for all iterations of a triply nested loop performed by the index sequence process.

The index sequence process produces sequences of indexes where each bit of the input is placed in a different bit position of the output and there is no input which is omitted from the output. Moreover, the index sequence process produces sequences of indexes where, if such reordering operations are combined with wide substitution operations, then, after logMN rounds all bits of the input have been fully mixed with each other, even if additions with carries are absent. In some embodiments, the entire sequence of steps of FIG. 9 is repeated more than one time.

Referring back to FIG. 3, write evaluation/process circuitry 320 provides a hash function generator to perform collision-free hashing for accessing cryptographic computing metadata stored in memory region 380. In one implementation, read evaluation/process circuitry 350 utilizes said hash function generator to apply a hash function, such as hash function 900 described with respect to FIG. 9, in order to access memory region 380.

The figures described herein detail exemplary architectures and systems to implement embodiments of the above. In some embodiments, one or more hardware components and/or instructions described herein are emulated as detailed below, or implemented as software modules.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-oforder core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures
In-Order and Out-of-Order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point—status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1106, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Figure 12:
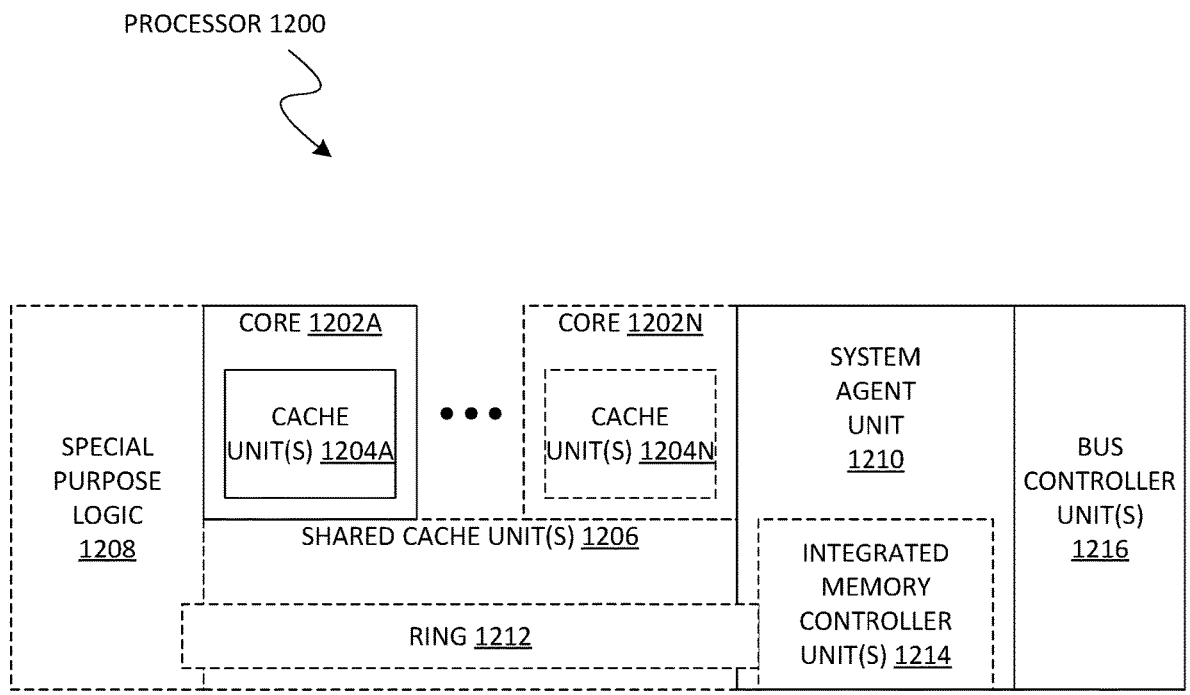
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes respective one or more levels of caches 1204A-N within cores 1202A-N, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multithreading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
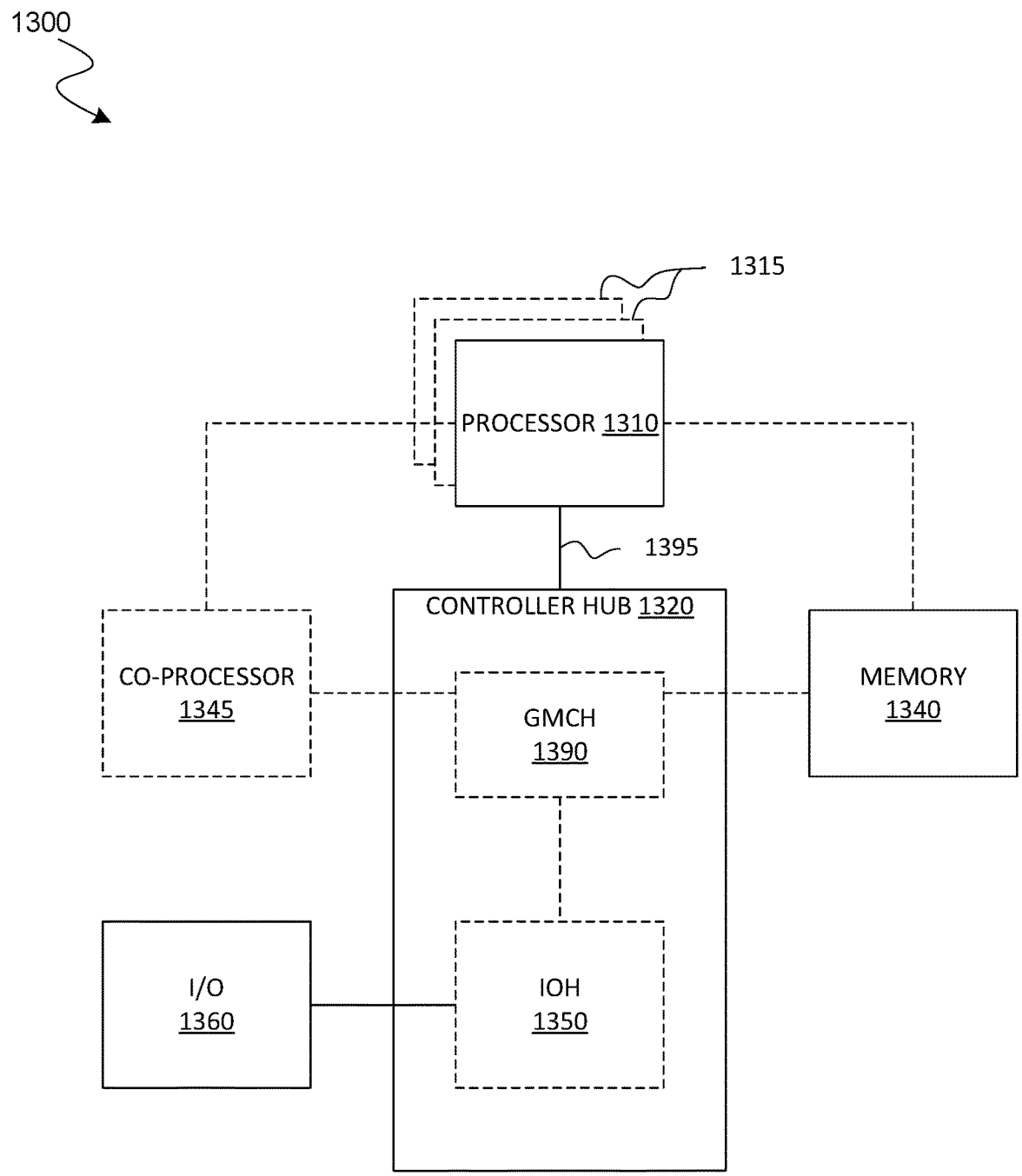
FIGS. 13-16 are block diagrams of exemplary computer architectures.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the processors 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor(s) 1345 accept and execute the received coprocessor instructions.

Figure 14:
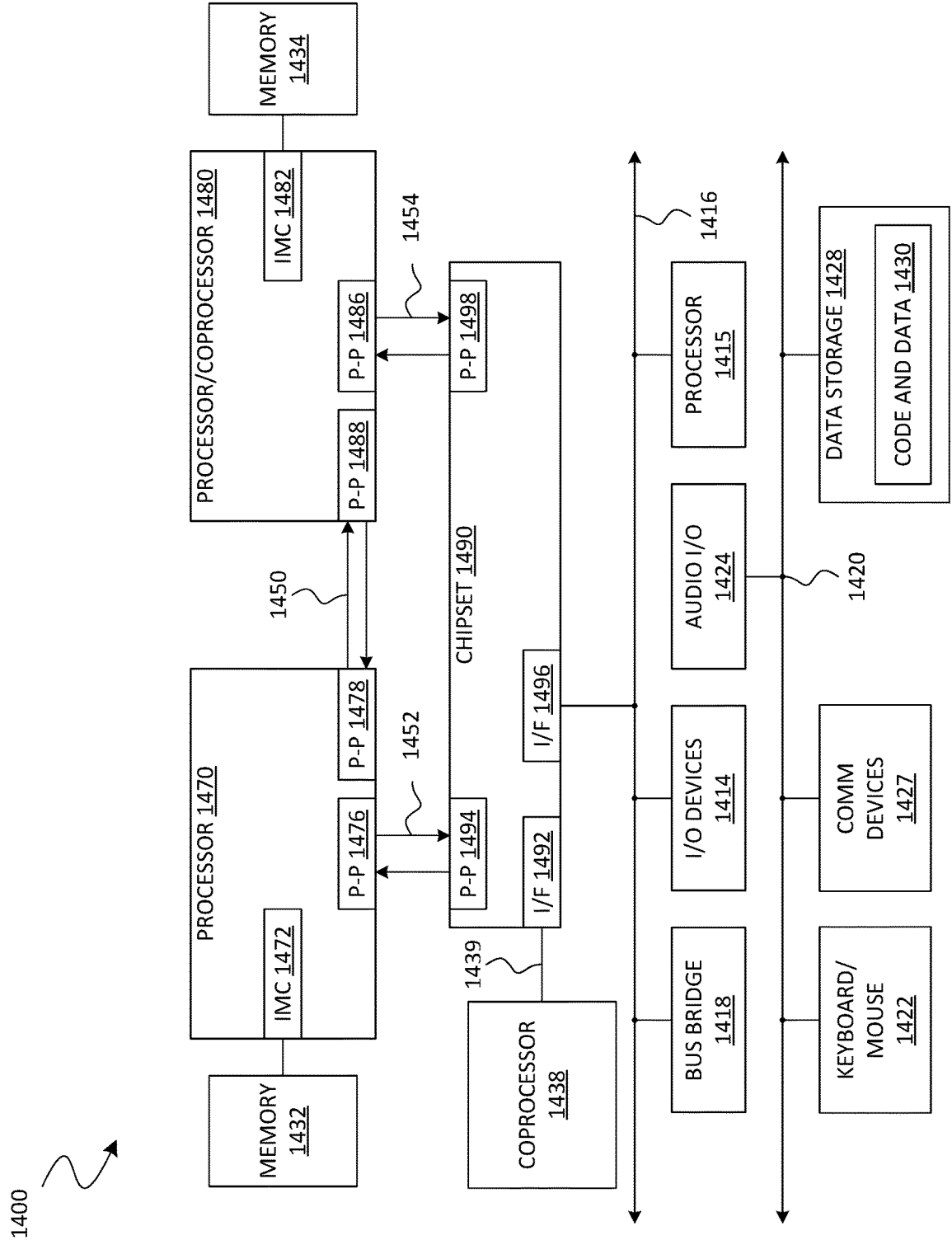

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller unit's point-to-point (P-P) interfaces 1476 and 1478; similarly, second processor 1480 includes P-P interfaces 1486 and 1488. Processors 1470, 1480 may exchange information via a point-to-point (P-P) interconnect 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1492 and an interconnect 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
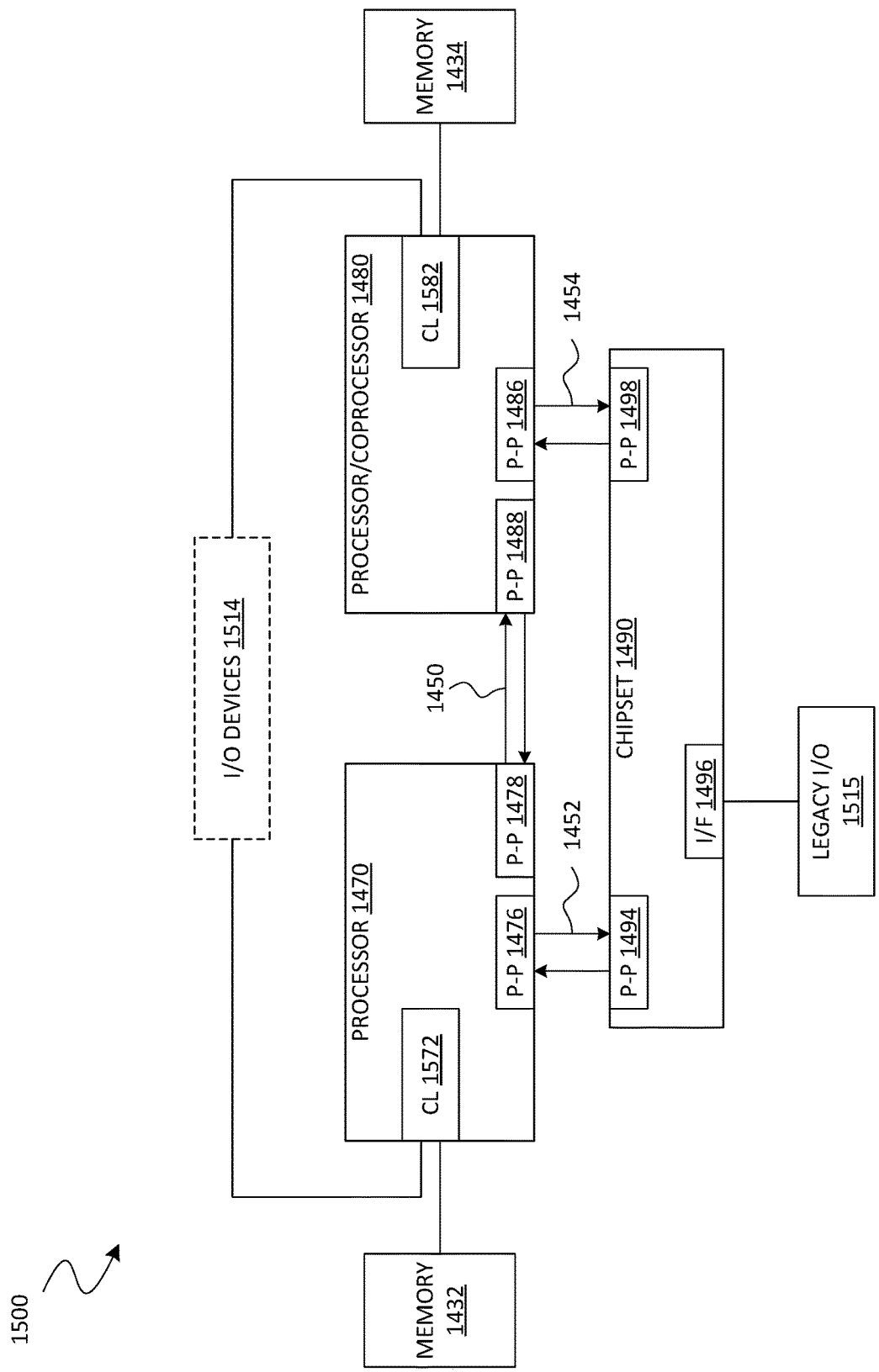

Referring now to FIG. 15, shown is a block diagram of a second more specific exemplary system 1500 in accordance with an embodiment of the present invention. Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1572 and 1582, respectively. Thus, the CL 1572, 1582 include integrated memory controller units and include I/O control logic. FIG. 15 illustrates that not only are the memories 1432, 1434 coupled to the CL 1572, 1582, but also that I/O devices 1514 are also coupled to the control logic 1572, 1582. Legacy I/O devices 1515 are coupled to the chipset 1490.

Figure 16:
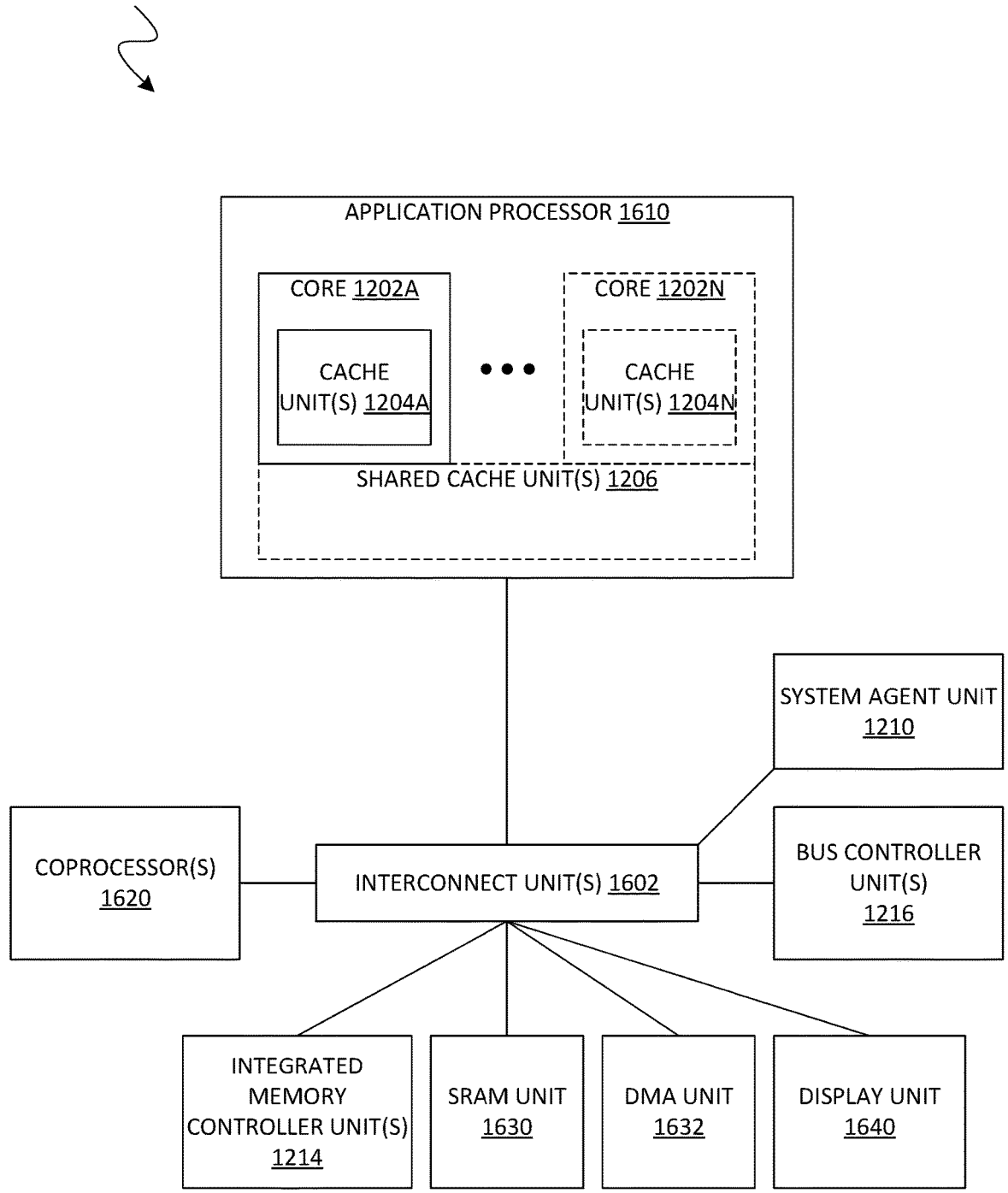

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 1202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor(s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
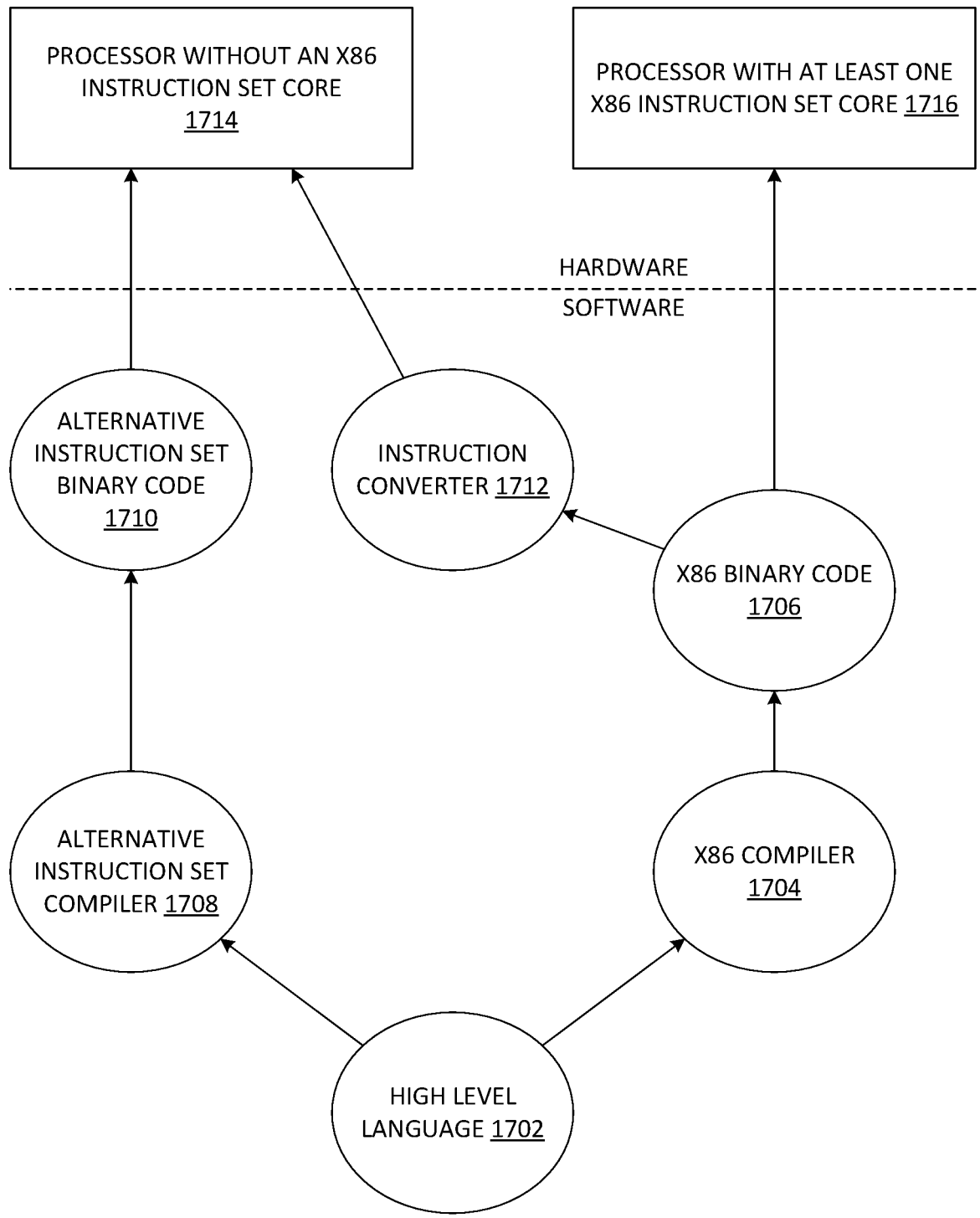
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, CA and/or that execute the ARM instruction set of ARM Holdings of Sunnyvale, CA). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

In one or more first embodiments, an apparatus comprises first circuitry to detect that data is to be cached, and to perform an evaluation, based on the data and a predefined criteria, of whether a line of a cache is able to accommodate a first representation of both the data and metadata corresponding to the metadata, and second circuitry coupled to the first circuitry. Where it is determined, based on the evaluation, that the line is able to accommodate the first representation, the second circuitry is to generate the first representation based on the data and the metadata, and store the first representation to the line, wherein, otherwise, the second circuitry is to generate a second representation based on the data, store the second representation to the line, and store the metadata to a sequestered memory region which is external to the cache.

In one or more second embodiments, further to the first embodiment, the apparatus further comprises third circuitry, coupled to the second circuitry, to update a metric of a utilization of the sequestered memory region based on the metadata being stored to the sequestered memory region.

In one or more third embodiments, further to the second embodiment, the apparatus further comprises fourth circuitry to provide the metric of the utilization to a software process, wherein, based on the metric, the software process is to modify an available capacity of the sequestered memory region.

In one or more fourth embodiments, further to the first embodiment or the second embodiment, the apparatus further comprises fifth circuitry to receive a message which requests the data, and read the second representation from the line based on the message, and sixth circuitry, coupled to the fifth circuitry, to detect, based on the second representation, that the metadata is stored at the sequestered memory region, retrieve the metadata from the sequestered memory region, and provide the data and the metadata in a response to the message.

In one or more fifth embodiments, further to the fourth embodiment, the sixth circuitry to detect that the metadata is stored at the sequestered memory region comprises the sixth circuitry to perform one of a decryption operation or a decompression operation, with the second representation, to generate a third representation of both the data and the metadata, and identify a portion of the third representation as an indicator that the metadata is stored at the sequestered memory region.

In one or more sixth embodiments, further to the fifth embodiment, the indicator comprises a pointer to a location in the sequestered memory region.

In one or more seventh embodiments, further to the fourth embodiment, the sixth circuitry to retrieve the metadata from the sequestered memory region comprises the sixth circuitry to perform a hash table lookup.

In one or more eighth embodiments, further to any of the first through seventh embodiments, the apparatus further comprises seventh circuitry to receive a message which requests the data, and read the first representation from the line based on the message, and eighth circuitry, coupled to the seventh circuitry, to identify both the data and the metadata each based on the first representation, and provide the data and the metadata in a response to the message.

In one or more ninth embodiments, further to any of the first through eighth embodiments, the second circuitry is to provide in one of the first representation or the second representation a bit value which specifies whether the metadata is stored outside of the line.

In one or more tenth embodiments, further to any of the first through ninth embodiments, the predefined criteria corresponds to a compressibility of the data.

In one or more eleventh embodiments, a system comprises an apparatus comprising first circuitry to detect that data is to be cached, and to perform an evaluation, based on the data and a predefined criteria, of whether a line of a cache is able to accommodate a first representation of both the data and metadata corresponding to the metadata, and second circuitry coupled to the first circuitry. Where it is determined, based on the evaluation, that the line is able to accommodate the first representation, the second circuitry is to generate the first representation based on the data and the metadata, and store the first representation to the line, wherein, otherwise, the second circuitry is to generate a second representation based on the data, store the second representation to the line, and store the metadata to a sequestered memory region which is external to the cache. The system further comprises a display device coupled to the apparatus, the display device comprising pixels to display an image based on a signal communicated with the apparatus.

In one or more twelfth embodiments, further to the eleventh embodiment, the apparatus further comprises third circuitry, coupled to the second circuitry, to update a metric of a utilization of the sequestered memory region based on the metadata being stored to the sequestered memory region.

In one or more thirteenth embodiments, further to the twelfth embodiment, the apparatus further comprises fourth circuitry to provide the metric of the utilization to a software process, wherein, based on the metric, the software process is to modify an available capacity of the sequestered memory region.

In one or more fourteenth embodiments, further to the eleventh embodiment or the twelfth embodiment, the apparatus further comprises fifth circuitry to receive a message which requests the data, and read the second representation from the line based on the message, and sixth circuitry, coupled to the fifth circuitry, to detect, based on the second representation, that the metadata is stored at the sequestered memory region, retrieve the metadata from the sequestered memory region, and provide the data and the metadata in a response to the message.

In one or more fifteenth embodiments, further to the fourteenth embodiment, the sixth circuitry to detect that the metadata is stored at the sequestered memory region comprises the sixth circuitry to perform one of a decryption operation or a decompression operation, with the second representation, to generate a third representation of both the data and the metadata, and identify a portion of the third representation as an indicator that the metadata is stored at the sequestered memory region.

In one or more sixteenth embodiments, further to the fifteenth embodiment, the indicator comprises a pointer to a location in the sequestered memory region.

In one or more seventeenth embodiments, further to the fourteenth embodiment, the sixth circuitry to retrieve the metadata from the sequestered memory region comprises the sixth circuitry to perform a hash table lookup.

In one or more eighteenth embodiments, further to any of the eleventh through fourteenth embodiments, the apparatus further comprises seventh circuitry to receive a message which requests the data, and read the first representation from the line based on the message, and eighth circuitry, coupled to the seventh circuitry, to identify both the data and the metadata each based on the first representation, and provide the data and the metadata in a response to the message.

In one or more nineteenth embodiments, further to any of the eleventh through fourteenth embodiments, the second circuitry is to provide in one of the first representation or the second representation a bit value which specifies whether the metadata is stored outside of the line.

In one or more twentieth embodiments, further to any of the eleventh through fourteenth embodiments, the predefined criteria corresponds to a compressibility of the data.

In one or more twenty-first embodiments, one or more computer-readable storage media have stored thereon instructions which, when executed by one or more processing units, cause the one or more processing units to perform a method comprising accessing a metric of a utilization of a sequestered memory region which stores metadata corresponding to data represented in a cache which is external to the sequestered memory region, wherein the sequestered memory region comprises first metadata corresponding to first data, and wherein a line of the cache comprises a representation of the first data and an indication that the first metadata is stored at the sequestered memory region, determining, based on the metric, that the utilization of a sequestered memory region satisfies one of a predetermined high utilization test condition or a predetermined low utilization test condition, and based on the determining, modifying a capacity of an unused portion of the sequestered memory region.

In one or more twenty-second embodiments, further to the twenty-first embodiment, the metric is based on an updating of a counter in response to either of a write of first metadata to the sequestered memory region, or a removal of first metadata from the sequestered memory region.

In one or more twenty-third embodiments, further to the twenty-first embodiment or the twenty-second embodiment, determining is based on one of a threshold maximum available capacity of the sequestered memory region, a threshold minimum available capacity of the sequestered memory region, or a rate of change of an available capacity of the sequestered memory region.

In one or more twenty-fourth embodiments, a method comprises detecting that data is to be cached, and to perform an evaluation, based on the data and a predefined criteria, of whether a line of a cache is able to accommodate a first representation of both the data and metadata corresponding to the metadata, and where it is determined, based on the evaluation, that the line is able to accommodate the first representation generating the first representation based on the data and the metadata, and storing the first representation to the line, otherwise generating a second representation based on the data, storing the second representation to the line, and storing the metadata to a sequestered memory region which is external to the cache.

In one or more twenty-fifth embodiments, further to the twenty-fourth embodiment, the method further comprises updating a metric of a utilization of the sequestered memory region.

In one or more twenty-sixth embodiments, further to the twenty-fifth embodiment, the method further comprises providing the metric of the utilization to a software process, wherein, based on the metric, the software process modifies an available capacity of the sequestered memory region.

In one or more twenty-seventh embodiments, further to the twenty-sixth embodiment, the method further comprises, with the software process, determining, based on the metric, that the utilization of a sequestered memory region satisfies one of a predetermined high utilization test condition or a predetermined low utilization test condition, and based on the determining, generating a message to modify the available capacity of the sequestered memory region.

In one or more twenty-eighth embodiments, further to the twenty-fourth embodiment or the twenty-fifth embodiment, the method of claim #, further comprises receiving a message which requests the data, reading the second representation from the line based on the message, detecting, based on the second representation, that the metadata is stored at the sequestered memory region, retrieving the metadata from the sequestered memory region, and providing the data and the metadata in a response to the message.

In one or more twenty-ninth embodiments, further to the twenty-eighth embodiment, detecting that the metadata is stored at the sequestered memory region comprises performing one of a decryption operation or a decompression operation, with the second representation, to generate a third representation of both the data and the metadata, and identifying a portion of the third representation as an indicator that the metadata is stored at the sequestered memory region.

In one or more thirtieth embodiments, further to the twenty-ninth embodiment, the indicator comprises a pointer to a location in the sequestered memory region.

In one or more thirty-first embodiments, further to the twenty-eighth embodiment, the fourth circuitry to retrieve the metadata from the sequestered memory region comprises the fourth circuitry to perform a hash table lookup.

In one or more thirty-second embodiments, further to any of the twenty-fourth through twenty-fifth embodiments, the method further comprises receiving a message which requests the data, reading the first representation from the line based on the message, identifying both the data and the metadata each based on the first representation, and providing the data and the metadata in a response to the message.

In one or more thirty-third embodiments, further to any of the twenty-fourth through twenty-fifth embodiments, the first representation or the second representation comprises a bit value which specifies whether the metadata is stored outside of the line.

In one or more thirty-fourth embodiments, further to any of the twenty-fourth through twenty-fifth embodiments, the predefined criteria corresponds to a compressibility of the data.

Techniques and architectures for providing metadata corresponding to cached data are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. An apparatus comprising:
   first circuitry to detect that data is to be cached, and to perform an evaluation, based on the data and a predefined criteria, of whether a line of a cache is able to accommodate a first representation of both the data and metadata corresponding to the data; and
   second circuitry coupled to the first circuitry, the second circuitry to detect, based on the evaluation, either one of:
      a first condition wherein the line is able to accommodate the first representation; or
      a second condition wherein the line is unable to accommodate the first representation;
   wherein, based on the first condition, the second circuitry is to:
      generate the first representation based on the data and the metadata; and
      store the first representation to the line; and
   wherein, based on the second condition, the second circuitry is to:
      generate a second representation based on the data;
      store the second representation to the line; and
      store the metadata to a sequestered memory region which is external to the cache.

2. The apparatus of claim 1, further comprising:
   third circuitry, coupled to the second circuitry, to update a metric of a utilization of the sequestered memory region based on the metadata being stored to the sequestered memory region.

3. The apparatus of claim 2, further comprising:
fourth circuitry to provide the metric of the utilization to a software process, wherein, based on the metric, the software process is to modify an available capacity of the sequestered memory region.

4. The apparatus of claim 1, further comprising fifth circuitry and sixth circuitry coupled to the fifth circuitry, the fifth circuitry to receive a message which requests the data, wherein, where the second circuitry detects the second condition:
the fifth circuitry is further to read the second representation from the line based on the message; and
the sixth circuitry is to:
detect, based on the second representation, that the metadata is stored at the sequestered memory region;
retrieve the metadata from the sequestered memory region; and
provide the data and the metadata in a response to the message.

5. The apparatus of claim 4, wherein the sixth circuitry to detect that the metadata is stored at the sequestered memory region comprises the sixth circuitry to:
perform one of a decryption operation or a decompression operation, with the second representation, to generate a third representation of both the data and the metadata; and
identify a portion of the third representation as an indicator that the metadata is stored at the sequestered memory region.

6. The apparatus of claim 5, wherein the indicator comprises a pointer to a location in the sequestered memory region.

7. The apparatus of claim 4, wherein the sixth circuitry to retrieve the metadata from the sequestered memory region comprises the sixth circuitry to perform a hash table lookup.

8. The apparatus of claim 1, further comprising seventh circuitry and eighth circuitry coupled to the seventh circuitry, the seventh circuitry to receive a message which requests the data, wherein, where the second circuitry detects the first condition:
the seventh circuitry is further to read the first representation from the line based on the message; and
the eighth circuitry is to:
identify both the data and the metadata each based on the first representation; and
provide the data and the metadata in a response to the message.

9. The apparatus of claim 1, wherein the second circuitry is to provide in one of the first representation or the second representation a bit value which specifies whether the metadata is stored outside of the line.

10. The apparatus of claim 1, wherein the predefined criteria corresponds to a compressibility of the data.

11. A system comprising
an apparatus comprising:
first circuitry to detect that data is to be cached, and to perform an evaluation, based on the data and a predefined criteria, of whether a line of a cache is able to accommodate a first representation of both the data and metadata corresponding to the data; and
second circuitry coupled to the first circuitry, the second circuitry to detect, based on the evaluation either one of:
a first condition wherein the line is able to accommodate the first representation; or
a second condition wherein the line is unable to accommodate the first representation;
wherein, based on the first condition, the second circuitry is to:
generate the first representation based on the data and the metadata; and
store the first representation to the line; and
wherein, based on the second condition, the second circuitry is to:
generate a second representation based on the data;
store the second representation to the line; and
store the metadata to a sequestered memory region which is external to the cache; and
a display device coupled to the apparatus, the display device comprising pixels to display an image based on a signal communicated with the apparatus.

12. The system of claim 11, the apparatus further comprising:
third circuitry, coupled to the second circuitry, to update a metric of a utilization of the sequestered memory region based on the metadata being stored to the sequestered memory region.

13. The system of claim 12, the apparatus further comprising:
fourth circuitry to provide the metric of the utilization to a software process, wherein, based on the metric, the software process is to modify an available capacity of the sequestered memory region.

14. The system of claim 11, the apparatus further comprising fifth circuitry and sixth circuitry coupled to the fifth circuitry, the fifth circuitry to receive a message which requests the data, wherein, where the second circuitry detects the second condition:
the fifth circuitry is further to read the second representation from the line based on the message; and
the sixth circuitry is to:
detect, based on the second representation, that the metadata is stored at the sequestered memory region;
retrieve the metadata from the sequestered memory region; and
provide the data and the metadata in a response to the message.

15. The system of claim 14, wherein the sixth circuitry to detect that the metadata is stored at the sequestered memory region comprises the sixth circuitry to:
perform one of a decryption operation or a decompression operation, with the second representation, to generate a third representation of both the data and the metadata; and
identify a portion of the third representation as an indicator that the metadata is stored at the sequestered memory region.

16. The system of claim 11, the apparatus further comprising seventh circuitry and eighth circuitry coupled to the seventh circuitry, the seventh circuitry to receive a message which requests the data, wherein, where the second circuitry detects the first condition:
the seventh circuitry is further to read the first representation from the line based on the message; and
the eighth circuitry is to:
identify both the data and the metadata each based on the first representation; and
provide the data and the metadata in a response to the message.

17. The system of claim 11, wherein the predefined criteria corresponds to a compressibility of the data.

18. One or more non-transitory computer-readable storage media having stored thereon instructions which, when executed by one or more processing units, cause the one or more processing units to perform a method comprising:

accessing a metric of a utilization of a sequestered memory region which stores metadata corresponding to data represented in a cache which is external to the sequestered memory region, wherein the sequestered memory region comprises first metadata corresponding to first data, and wherein a line of the cache comprises a representation of the first data and an indication that the first metadata is stored at the sequestered memory region;

determining, based on the metric, that the utilization of the sequestered memory region satisfies one of a predetermined high utilization test condition or a predetermined low utilization test condition; and based on the determining, modifying a capacity of an unused portion of the sequestered memory region.

19. The one or more non-transitory computer-readable storage media of claim 18, wherein the metric is based on an updating of a counter in response to either of:

a write of first metadata to the sequestered memory region; or a removal of first metadata from the sequestered memory region.

20. The one or more non-transitory computer-readable storage media of claim 18, wherein determining is based on one of a threshold maximum available capacity of the sequestered memory region, a threshold minimum available capacity of the sequestered memory region, or a rate of change of an available capacity of the sequestered memory region.

\* \* \* \* \*